(12) United States Patent
Konishi et al.

(10) Patent No.: US 11,525,364 B2
(45) Date of Patent: Dec. 13, 2022

(54) TRANSITION PIECE, COMBUSTOR PROVIDED WITH SAME, AND GAS TURBINE PROVIDED WITH COMBUSTOR

(71) Applicant: Mitsubishi Power, Ltd., Kanagawa (JP)

(72) Inventors: Tetsu Konishi, Yokohama (JP); Hiroaki Kishida, Yokohama (JP); Kentaro Tokuyama, Yokohama (JP); Hiroki Shibata, Yokohama (JP); Akihiro Murakami, Yokohama (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 53 days.

(21) Appl. No.: 17/140,694

(22) Filed: Jan. 4, 2021

(65) Prior Publication Data

US 2021/0123351 A1   Apr. 29, 2021

Related U.S. Application Data

(62) Division of application No. 15/544,384, filed as application No. PCT/JP2016/052021 on Jan. 25, 2016, now abandoned.

(30) Foreign Application Priority Data

Jan. 30, 2015 (JP) ................................. 2015-017840

(51) Int. Cl.
*F01D 9/02* (2006.01)
*F23R 3/06* (2006.01)
(Continued)

(52) U.S. Cl.
CPC ............. *F01D 9/023* (2013.01); *F01D 5/082* (2013.01); *F01D 25/12* (2013.01); *F01D 25/24* (2013.01);
(Continued)

(58) Field of Classification Search
CPC .............. F23R 3/04; F23R 2900/03042; F23R 2900/03043; F23R 3/06; F02C 7/18; F02C 7/00; F01D 25/12; F01D 9/023
See application file for complete search history.

(56) References Cited

U.S. PATENT DOCUMENTS

| 6,546,627 B1* | 4/2003 | Sekihara ................... F23R 3/00 |
| | | 29/889.22 |
| 2006/0130484 A1* | 6/2006 | Marcum ................. F01D 9/023 |
| | | 60/752 |

(Continued)

FOREIGN PATENT DOCUMENTS

| CN | 102227550 | 10/2011 |
| CN | 106715835 | 5/2017 |

(Continued)

OTHER PUBLICATIONS

International Search Report dated Apr. 26, 2016 in International Application No. PCT/JP2016/052021, with English translation.

(Continued)

*Primary Examiner* — Todd E Manahan
*Assistant Examiner* — Rodolphe Andre Chabreyrie
(74) *Attorney, Agent, or Firm* — Wenderoth, Lind & Ponack, L.L.P.

(57) ABSTRACT

A plurality of cooling passages extending in an axial direction are formed in a transition piece so as to be aligned in a circumferential direction and the axial direction. One or more downstream side passages are formed in a downstream side region (Rd) within one circumferential region. One or more upstream side passages are formed in an upstream side region Ru within the circumferential region. The total cross-sectional area per unit circumferential length of the one or more downstream side passages is larger than the total (Continued)

cross-sectional area per unit circumferential length of the one or more upstream side passages.

15 Claims, 14 Drawing Sheets

(51) Int. Cl.
    *F01D 25/24* (2006.01)
    *F02C 7/18* (2006.01)
    *F23R 3/42* (2006.01)
    *F01D 5/08* (2006.01)
    *F01D 25/12* (2006.01)
    *F02C 3/04* (2006.01)
    *F23R 3/28* (2006.01)

(52) U.S. Cl.
    CPC ............... *F02C 3/04* (2013.01); *F02C 7/18* (2013.01); *F23R 3/06* (2013.01); *F23R 3/28* (2013.01); *F23R 3/42* (2013.01); *F05D 2220/32* (2013.01); *F05D 2240/35* (2013.01); *F05D 2260/20* (2013.01)

(56) References Cited

U.S. PATENT DOCUMENTS

| | | |
|---|---|---|
| 2010/0170260 A1 | 7/2010 | Mawatari et al. |
| 2011/0146284 A1 | 6/2011 | Morimoto et al. |
| 2011/0232299 A1* | 9/2011 | Stryapunin ............... F23R 3/04 165/104.11 |
| 2013/0074502 A1 | 3/2013 | Hada et al. |
| 2013/0098063 A1 | 4/2013 | Mizukami et al. |
| 2014/0144147 A1 | 5/2014 | Kishida |
| 2014/0150453 A1* | 6/2014 | Sekihara ................... F23R 3/60 60/796 |
| 2016/0047312 A1* | 2/2016 | Hase ....................... F23R 3/005 60/806 |

FOREIGN PATENT DOCUMENTS

| | | |
|---|---|---|
| JP | 62-150543 | 9/1987 |
| JP | 3-30540 | 3/1991 |
| JP | 10-82527 | 3/1998 |
| JP | 2004-44538 | 2/2004 |
| JP | 2008-274774 | 11/2008 |
| JP | 2010-261318 | 11/2010 |
| JP | 2012-77660 | 4/2012 |
| JP | 2013-72316 | 4/2013 |
| JP | 2017-524855 | 8/2017 |
| WO | 2016/024007 | 2/2016 |

OTHER PUBLICATIONS

Written Opinion of the International Searching Authority dated Apr. 26, 2016 in International Application No. PCT/JP2016/052021, with English translation.

* cited by examiner

S2>S1

TRANSITION PIECE, COMBUSTOR PROVIDED WITH SAME, AND GAS TURBINE PROVIDED WITH COMBUSTOR

TECHNICAL FIELD

The present invention relates to a transition piece demarcating a flow path where combustion gas flows, a combustor provided with the same, and a gas turbine provided with a combustor.

This application claims priority to Japanese Patent Application No. 2015-017840 filed in Japan on Jan. 30, 2015, the contents of which are incorporated herein by reference.

BACKGROUND ART

A combustor of a gas turbine includes: a transition piece that demarcates a flow path of combustion gas; and a fuel supply unit that supplies fuel and air into the transition piece. Fuel is combusted and combustion gas generated from fuel combustion flows in the transition piece. Therefore, an inner circumferential surface of the transition piece is exposed to extremely high-temperature combustion gas.

Therefore, a plurality of cooling passages are formed between an outer circumferential surface and inner circumferential surface of a combustion liner demarcating the flow path of combustion gas, in a combustor disclosed in the following Patent Document 1, for example. A cooling medium flows in the cooling passages.

CITATION LIST

Patent Document

Patent Document 1: Japanese Unexamined Patent Application Publication No. 2010-261318A

SUMMARY OF INVENTION

Technical Problems

The transition piece must be maintained at a fixed temperature or lower from the perspective of durability and the like. Therefore, if a large number of cooling passages with a large cross-sectional area are formed in the transition piece and a cooling medium is supplied in the cooling passages, the entire transition piece can be maintained at a fixed temperature or lower. On the other hand, the flow rate of the cooling medium supplied to the transition piece is preferably minimized from the perspective of operational cost and the like.

Therefore, an object of the present invention is to provide: a transition piece that can suppress the flow rate of a cooling medium while maintaining durability; a combustor provided with the same; and a gas turbine provided with the combustor.

Solution to Problem

A transition piece of a first aspect of the invention for achieving the aforementioned object is a transition piece demarcating a periphery of a combustion gas flow path where combustion gas flows from an upstream side to a downstream side in an axial direction in which an axis extends, wherein: a plurality of cooling passages which extend in the axial direction and inside which a cooling medium flows are formed so as to be aligned in the axial direction and a circumferential direction with regard to the axis; one or more downstream side passages which are a portion of the plurality of cooling passages are formed in a downstream side region on the downstream side within at least one circumferential region in the circumferential direction, and one or more upstream side passages which are another portion of the plurality of cooling passages are formed in an upstream side region on the upstream side with regard to the downstream side region within the circumferential region; and a total cross-sectional area per unit circumferential length of the one or more downstream side passages in the downstream side region is greater than a total cross-sectional area per unit circumferential length of the one or more upstream side passages in the upstream side region.

Combustion of fuel in the combustion gas flow path in the transition piece progresses toward the downstream side. Therefore, the downstream side reaches a higher temperature than the upstream side in the combustion gas flow path. Therefore, the transition piece is exposed to high temperature gas more on the downstream side than the upstream side. Furthermore, the combustion gas flow path in the transition piece often gradually narrows from the upstream side towards the downstream side. In this case, the gas flow velocity is higher on the downstream side than the upstream side in the combustion gas flow path, and the heat transfer coefficient between the transition piece and the gas is higher on the downstream side than the upstream side. Therefore, the transition piece is more prone to heating on the downstream side than the upstream side.

In this transition piece, the total cross-sectional area per unit circumferential length of the one or more downstream side passages in the downstream side region within one circumferential region in the circumferential direction is larger than the total cross-sectional area per unit circumferential length of the one or more upstream side passages in the upstream side region within the same circumferential region. Therefore, in this transition piece, cooling performance by a cooling medium in the downstream side region can be enhanced. Furthermore, in this transition piece, the flow rate of the cooling medium flowing through the upstream side passage can be suppressed.

A transition piece of a second aspect of the invention for achieving the aforementioned object is the transition piece of the first aspect, wherein the number of the downstream side passages in the downstream side region may be greater than the number of the upstream side passages in the upstream side region.

A transition piece according to a third aspect of the invention for achieving the aforementioned object is a transition piece demarcating a periphery of a combustion gas flow path where combustion gas flows from an upstream side to a downstream side in an axial direction in which an axis extends, wherein: a plurality of cooling passages which extend in the axial direction and inside which a cooling medium flows are formed so as to be aligned in the axial direction and a circumferential direction with regard to the axis; one or more downstream side passages which are a portion of the plurality of cooling passages are formed in a downstream side region on the downstream side within at least one circumferential region in the circumferential direction, and one or more upstream side passages which are another portion of the plurality of cooling passages are formed in an upstream side region on the upstream side with regard to the downstream side region within the circumferential region; and a ratio of a cross-sectional area of the downstream side passage to a length in the axial direction of the downstream side passage is larger than a ratio of a cross-sectional area of the upstream side passage to a length in the axial direction of the upstream side passage.

As described above, the transition piece is more prone to heating on the downstream side than the upstream side.

In this transition piece, the ratio of the cross-sectional area of the downstream side passage to the length in the axial direction of the downstream side passage in the downstream side region within one circumferential region in the circumferential direction is larger than the ratio of the cross-sectional area of the upstream side passage to the length in the axial direction of the upstream side passage in the upstream side region within the same circumferential region. Therefore, in this transition piece, cooling performance by a cooling medium in the downstream side region can be enhanced. Furthermore, in this transition piece, the flow rate of the cooling medium flowing through the upstream side passage can be suppressed.

A transition piece of a fourth aspect of the invention for achieving the aforementioned object is the transition piece of the third aspect, wherein the length in the axial direction of the downstream side passage may be shorter than the length in the axial direction of the upstream side passage.

A transition piece of a fifth aspect of the invention for achieving the aforementioned object is the transition piece of any one of the first to fourth aspects, wherein a cross-sectional area of the downstream side passage may be larger than a cross-sectional area of the upstream side passage.

A transition piece of a sixth aspect of the invention for achieving the aforementioned object is the transition piece of any one of the first to fifth aspects, including a body portion that demarcates a portion of the combustion gas flow path, is formed by bonding ends of one or more plate materials together, and has a bonded portion that is a portion where the ends of the one or more plate materials are bonded together and extends in the axial direction, wherein the upstream side passage and the downstream side passage may be formed in the body portion.

A transition piece of a seventh aspect of the invention for achieving the aforementioned object is the transition piece of any one of the first to sixth aspects, provided in a gas turbine casing that covers a gas turbine rotor, wherein: one or more rotor side passages which are a portion of the plurality of cooling passages may be formed in a rotor side region opposing the gas turbine rotor within at least one axial region in the axial direction, and one or more casing side passages which are another portion of the plurality of cooling passages may be formed in a casing side region opposing an inner circumferential surface of the gas turbine casing within the axial region; and a total cross-sectional area per unit circumferential length of the one or more casing side passages in the casing side region may be larger than a total cross-sectional area per unit circumferential length of the one or more rotor side passages in the rotor side region.

A discharge opening of the compressor is present on an inner side in a radial direction of the transition piece, in a radial direction based on a rotational axis of the gas turbine. Therefore, compressed air at a high flow velocity immediately after flowing out from the compressor is directly blown onto the rotor side region of the transition piece. On the other hand, the compressed air is stagnant on an outer side in the radial direction of the transition piece, and therefore, the flow velocity of the compressed air is low. Therefore, the heat transfer coefficient between the transition piece and compressed air that is present on an outer circumferential side of the transition piece is higher in the rotor side region and lower in the casing side region, of the regions in the circumferential direction in the transition piece. As a result, the cooling effect on the transition piece exerted by the compressed air that is present on the outer circumferential side of the transition piece is higher in the rotor side region and lower in the casing side region.

In this transition piece, the total cross-sectional area per unit circumferential length of the one or more casing side passages in the casing side region within at least one axial region in the axial direction is larger than the total cross-sectional area per unit circumferential length of the one or more rotor side passages in the rotor side region within the same axial region. Therefore, in this transition piece, cooling performance by a cooling medium in the casing side region can be enhanced. Furthermore, in this transition piece, the flow rate of the cooling medium flowing through the cooling passage in the rotor side region can be suppressed.

A transition piece of an eighth aspect of the invention for achieving the aforementioned object is a transition piece provided in a gas turbine casing that covers a gas turbine rotor and demarcating a periphery of a combustion gas flow path where combustion gas flows from an upstream side to a downstream side in an axial direction in which an axis extends, wherein: a plurality of cooling passages which extend in the axial direction and inside which a cooling medium flows are formed so as to be aligned in a circumferential direction with regard to the axis; one or more rotor side passages which are a portion of the plurality of cooling passages are formed in a rotor side region opposing the gas turbine rotor within at least one axial region in the axial direction, and one or more casing side passages which are another portion of the plurality of cooling passages are formed in a casing side region opposing an inner circumferential surface of the gas turbine casing within the axial region; and a total cross-sectional area per unit circumferential length of the one or more casing side passages in the casing side region is greater than a total cross-sectional area per unit circumferential length of the one or more rotor side passages in the rotor side region.

As described above, the cooling effect on the transition piece exerted by the compressed air that is present on the outer circumferential side of the transition piece is higher in the rotor side region and lower in the casing side region, of the regions in the circumferential direction in the transition piece.

In this transition piece, too, the total cross-sectional area per unit circumferential length of the one or more casing side passages in the casing side region within at least one axial region in the axial direction is larger than the total cross-sectional area per unit circumferential length of the one or more rotor side passages in the rotor side region within the same axial region. Therefore, in this transition piece, too, cooling performance by a cooling medium in the casing side region can be enhanced. Furthermore, in this transition piece, the flow rate of the cooling medium flowing through the cooling passage in the rotor side region can be suppressed.

A transition piece of a ninth aspect of the invention for achieving the aforementioned object is the transition piece of the seventh or eighth aspect, wherein the number of the casing side passages in the casing side region may be higher than the number of the rotor side passages in the rotor side region.

A transition piece of a tenth aspect of the invention for achieving the aforementioned object is a transition piece provided in a gas turbine casing that covers a gas turbine rotor and demarcating a periphery of a combustion gas flow path where combustion gas flows from an upstream side to a downstream side in an axial direction in which an axis extends, wherein: a plurality of cooling passages which extend in the axial direction and inside which a cooling medium flows are formed so as to be aligned in a circumferential direction with regard to the axis; one or more rotor side passages which are a portion of the plurality of cooling passages are formed in a rotor side region opposing the gas turbine rotor within at least one axial region in the axial direction, and one or more casing side passages which are another portion of the plurality of cooling passages are formed in a casing side region opposing an inner circumferential surface of the gas turbine casing within the axial region; and a ratio of a cross-sectional area of the casing side passage to a length in the axial direction of the casing side passage is larger than a ratio of a cross-sectional area of the rotor side passage to a length in the axial direction of the rotor side passage.

As described above, the cooling effect on the transition piece exerted by the compressed air that is present on the outer circumferential side of the transition piece is higher in the rotor side region and lower in the casing side region, of the regions in the circumferential direction in the transition piece.

In this transition piece, the ratio of the cross-sectional area of the casing side passage to the length in the axial direction of the casing side passage in the casing side region within at least one axial region in the axial direction is larger than the ratio of the cross-sectional area of the rotor side passage to the length in the axial direction of the rotor side passage in the rotor side region within the same axial region.

Therefore, in this transition piece, too, cooling performance by a cooling medium in the casing side region can be enhanced. Furthermore, in this transition piece, the flow rate of the cooling medium flowing through the cooling passage in the rotor side region can be suppressed.

A transition piece of an eleventh aspect of the invention for achieving the aforementioned object is the transition piece of the tenth aspect, wherein the length in the axial direction of the casing side passage may be shorter than the length in the axial direction of the rotor side passage.

A transition piece of a twelfth aspect of the invention for achieving the aforementioned object is the transition piece of any one of the seventh to eleventh aspects, wherein the cross-sectional area of the casing side passage may be larger than the cross-sectional area of the rotor side passage.

A transition piece of a thirteenth aspect of the invention for achieving the aforementioned object is the transition piece of any one of the seventh to twelfth aspects, including a body portion that demarcates a portion of the combustion gas flow path, is formed by bonding ends of one or more plate materials together, and has a bonded portion that is a portion where the ends of the one or more plate materials are bonded together and extends in the axial direction, wherein the rotor side passage and the casing side passage may be formed in the body portion.

A transition piece of a fourteenth aspect of the invention for achieving the aforementioned object is the transition piece of the sixth or thirteenth aspect, wherein a length in the axial direction of a bond side passage of the plurality of cooling passages that is nearest to the bonded portion in the circumferential direction may be shorter than a length in the axial direction of an adjacent passage of the plurality of cooling passages that is adjacent to the bond side passage in the circumferential direction.

Of pairs of cooling passages adjacent in the circumferential direction, an interval between a pair of cooling passages with the bonded portion provided between the two cooling passages is wider than an interval between other pairs of cooling passages. Therefore, the cooling performance by a cooling medium per unit circumferential length is lower between the pair of cooling passages with the bonded portion provided therebetween.

Therefore, in this transition piece, the length in the axial direction of the bond side passage which is a cooling passage nearest to the bonded portion in the circumferential direction is shorter than the length in the axial direction of another cooling passage adjacent to this bond side passage in the circumferential direction. Therefore, in this transition piece, the cooling performance of the bond side passage can be enhanced, and an area between the pair of cooling passages between which a bonded portion is provided can be cooled as equally well as areas between other pairs of cooling passages.

A transition piece of a fifteenth aspect of the invention for achieving the aforementioned object is a transition piece demarcating a periphery of a combustion gas flow path where combustion gas flows from an upstream side to a downstream side in an axial direction in which an axis extends, the transition piece including a body portion that demarcates a portion of the combustion gas flow path, is formed by bonding ends of one or more plate materials together, and has a bonded portion that is a portion where the ends of the one or more plate materials are bonded together and extends in the axial direction, wherein: a plurality of cooling passages which extend in the axial direction and inside which a cooling medium flows are formed in the body portion so as to be aligned in the axial direction and a circumferential direction with regard to the axis; and a length in the axial direction of a bond side passage of the plurality of cooling passages that is nearest to the bonded portion in the circumferential direction is shorter than a length in the axial direction of an adjacent passage of the plurality of cooling passages that is adjacent to the bond side passage in the circumferential direction.

In this transition piece, too, the length in the axial direction of the bond side passage which is a cooling passage nearest to the bonded portion in the circumferential direction is shorter than the length in the axial direction of another cooling passage adjacent to this bond side passage in the circumferential direction. Therefore, in this transition piece, too, the cooling performance of the bond side passage can be enhanced, and an area between a pair of cooling passages between which the bonded portion is provided can be cooled as equally well as areas between other pairs of cooling passages.

A transition piece of a sixteenth aspect of the invention for achieving the aforementioned object is the transition piece of the fourteenth or fifteenth aspect, wherein a cross-sectional area of the bond side passage may be larger than a cross-sectional area of the adjacent passage.

A transition piece of a seventeenth aspect of the invention for achieving the aforementioned object is the transition piece of any one of the first to sixteenth aspects, wherein, in at least some cooling passages of the plurality of cooling passages, an inlet into which the cooling medium flows may be formed at a downstream side end portion, and an outlet out of which the cooling medium flows may be formed at an upstream side end portion.

In this transition piece, the cooling medium flows from the downstream side to the upstream side in the axial direction in at least some cooling passages. Therefore, in this transition piece, the downstream side of at least some cooling passages can be effectively cooled.

A transition piece of an eighteenth aspect of the invention for achieving the aforementioned object is the transition piece of any one of the first to sixteenth aspects, wherein the plurality of cooling passages may each have the same cross-sectional area at any position in the axial direction.

A combustor of a nineteenth aspect of the invention for achieving the aforementioned object includes: any of the above-described transition pieces; and a fuel supply unit supplying fuel and air into the combustion gas flow path.

A gas turbine of a twentieth aspect of the invention for achieving the aforementioned object includes: the combustor; a compressor that compresses air and supplies the compressed air to the combustor; and a turbine that is driven by the combustion gas from the combustor.

Advantageous Effects of Invention

In one aspect according to the present invention, it is possible to suppress the flow rate of a cooling medium while maintaining the durability of the transition piece.

DESCRIPTION OF EMBODIMENTS

The following describes in detail various embodiments of the present invention, with reference to the drawings.

Embodiment of Gas Turbine

Figure 1:
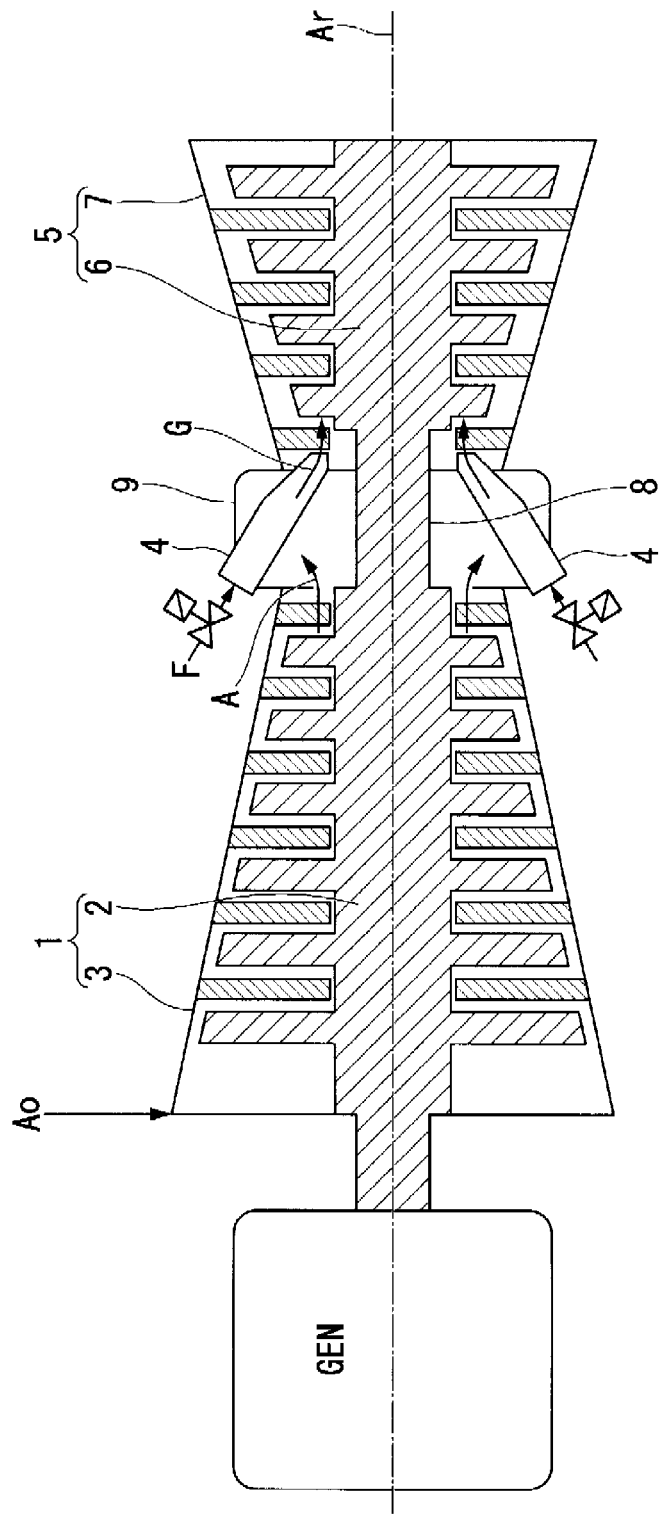
FIG. 1 is a schematic view illustrating a configuration of a gas turbine according to an embodiment of the present invention.

As illustrated in FIG. 1, a gas turbine according to the present embodiment includes a compressor 1 that generates compressed air A by compressing outside air Ao, a plurality of combustors 4 that generate combustion gas G by combusting fuel F in the compressed air A, and a turbine 5 driven by the combustion gas G.

The compressor 1 has a compressor rotor 2 that rotates around a rotational axis Ar and a compressor casing 3 that covers the compressor rotor 2 such that the compressor rotor can rotate. The turbine 5 has a turbine rotor 6 that rotates around a rotational axis Ar and a turbine casing 7 that covers the turbine rotor 6 such that the turbine rotor can rotate. The rotational axis Ar of the compressor rotor 2 and the rotational axis Ar of the turbine rotor 6 are located on the same straight line. The compressor rotor 2 and the turbine rotor 6 are mutually connected to form a gas turbine rotor 8. Further, the compressor casing 3 and the turbine casing 7 are mutually connected to form a gas turbine casing 9.

A rotor of a generator GEN is connected to the gas turbine rotor 8, for example. The plurality of combustors 4 are aligned in a circumferential direction around the rotational axis Ar, and fixed to the gas turbine casing 9.

Figure 2:
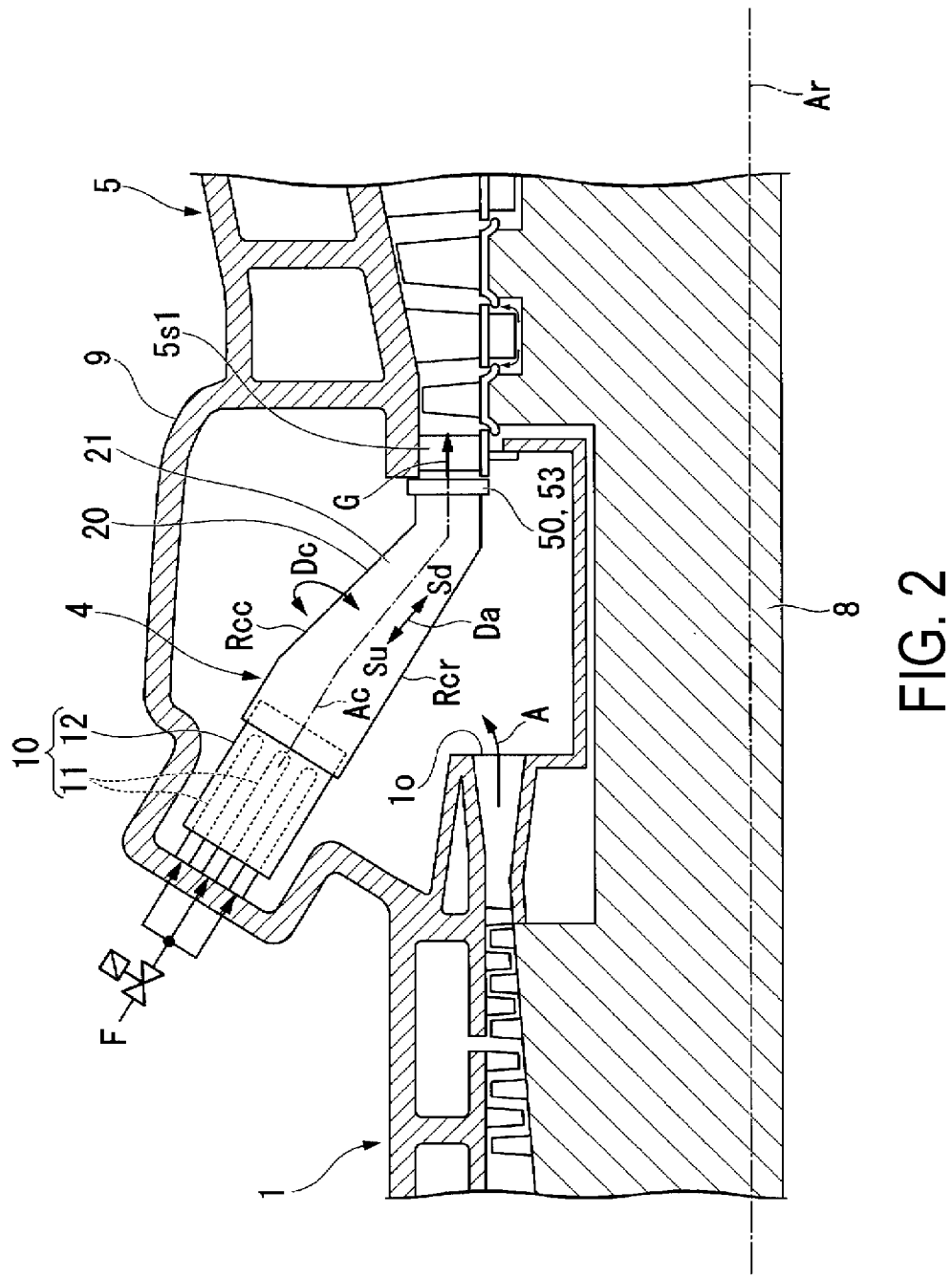
FIG. 2 is a cross-sectional view of the vicinity of a combustor in the gas turbine according to the embodiment of the present invention.

As illustrated in FIG. 2, the combustor 4 has a transition piece 20 and a fuel supply unit 10 that sends the fuel F and air A into the transition piece 20. Inside the transition piece 20, the fuel F from the fuel supply unit 10 is combusted in the air A from the fuel supply unit 10. Inside the transition piece 20, the combustion gas G is generated as a result of the combustion. The transition piece 20 sends the combustion gas G to a combustion gas flow path of the turbine 5. The combustors 4 are provided inside the gas turbine casing 9, in a space where the compressed air A compressed by the compressor 1 drifts.

The fuel supply unit 10 includes a plurality of burners 11 that discharge fuel and air, and a burner retaining cylinder 12 that retains the plurality of burners 11. The plurality of burners 11 are all supported by the burner retaining cylinder 12 parallel to a combustor axis Ac. Furthermore, the plurality of burners 11 all discharge the fuel F from a first side to a second side in the axial direction Da in which the combustor axis Ac extends. The transition piece 20 forms a cylindrical shape extending in the axial direction Da, and demarcates a periphery of a combustion gas flow path 21 in which the combustion gas G flows. The transition piece 20 is formed around the combustor axis Ac. The combustion gas flow path 21 gradually narrows from a first side towards a second side in the axial direction Da. Therefore, the cross-sectional area of a cross section orthogonal to the combustor axis Ac of the transition piece 20 gradually decreases from the first side towards the second side in the axial direction Da. Note that hereinafter, the first side in the axial direction Da is referred to as an upstream side Su, and the second side in the axial direction Da is referred to as a downstream side Sd. Furthermore, a circumferential direction of the combustion gas flow path 21, in other words, a circumferential direction with regard to the combustor axis Ac is simply referred to as a circumferential direction Dc.

As described above, the combustor 4 is provided inside the gas turbine casing 9, in a space where the compressed air A compressed by the compressor 1 drifts. Therefore, one region in the circumferential direction Dc of the transition piece 20 forms a rotor side region Rcr opposite from the gas turbine rotor 8, and another region in the circumferential direction Dc of the transition piece 20 forms a casing side region Rcc opposite from an inner circumferential surface of the gas turbine casing 9.

First Embodiment of Transition Piece

A first embodiment of a transition piece is described while referring to FIG. 3 to FIG. 7.

Figure 3:
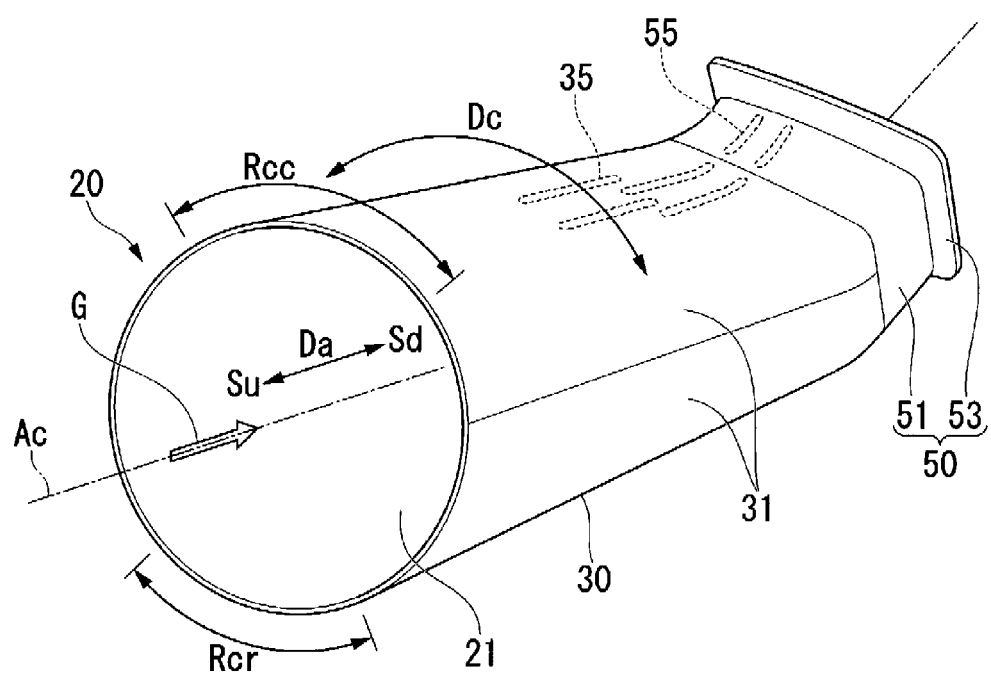
FIG. 3 is a perspective view of a transition piece according to a first embodiment of the present invention.

As illustrated in FIG. 3, the transition piece 20 of the present embodiment has a body portion 30 and an outlet flange portion 50 bonded to the downstream side Sd of the body portion 30.

The outlet flange portion 50 has a cylinder 51 forming a cylindrical shape and demarcating a portion of the combustion gas flow path 21, and a flange 53 formed on a downstream end of the cylinder 51. As illustrated in FIG. 2, the flange 53 connects the transition piece 20 to a first stage vane 5s1 of the turbine 5. The cylinder 51 and flange 53 are integrally molded by casting or the like to form the outlet flange portion 50. A thermal barrier coating (TBC) layer not illustrated in the drawings is formed on an inner circumferential surface of the cylinder 51. Furthermore, a plurality of cooling passages 55 extending in the axial direction Da are formed in the outlet flange portion 50. An inlet of the cooling passage 55 is formed in an outer circumferential surface of the cylinder 51, and an outlet of the cooling passage 55 is formed in a flange end surface of the flange 53.

The body portion 30 is formed into a cylindrical shape by bending a plurality of laminate plates 31, aligning the plurality of bent laminate plates 31 in the circumferential direction Dc, and then mutually bonding ends of the laminate plates 31 in the circumferential direction Dc by welding. Note that in an example illustrated in FIG. 3, two sheets of the laminate plate 31 are aligned in the circumferential direction Dc, but three or more sheets, for example, four sheets of the laminate plates 31 may be aligned in the circumferential direction Dc. Furthermore, one sheet of the laminate plate 31 may be bent into a cylindrical shape, and ends of the one sheet of laminate plate 31 may be mutually bonded by welding.

Figure 5:
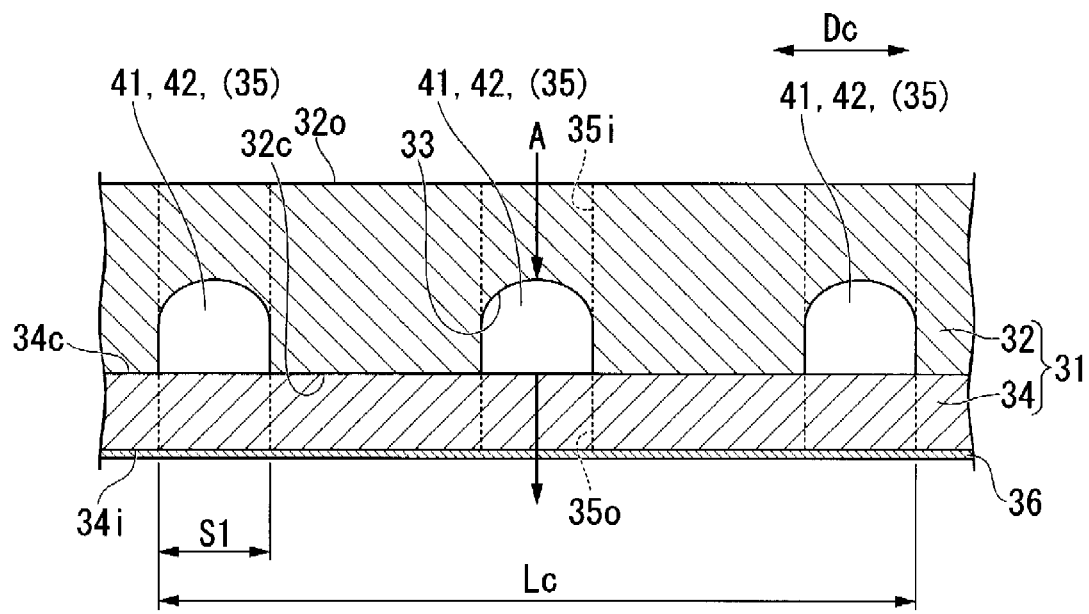
FIG. 5 is a cross-sectional view taken along a line V-V in FIG. 4.

As illustrated in FIG. 5, the laminate plate 31 has an outer plate 32 and an inner plate 34. Of a pair of surfaces facing opposite directions of the outer plate 32, a first surface forms an outer circumferential surface 32o and a second surface forms a bond surface 32c. Furthermore, of a pair of surfaces facing opposite directions of the inner plate 34, a first surface forms a bond surface 34c and a second surface forms an inner circumferential surface 34i. In the bond surface 32c of the outer plate 32, a plurality of long grooves 33 recessed towards the outer circumferential surface 32o and extending in a constant direction are formed. The bond surfaces 32c, 34c of the outer plate 32 and the inner plate 34 are bonded together by brazing or the like to form the laminate plate 31. By bonding the outer plate 32 and inner plate 34, openings of the long grooves 33 formed in the outer plate 32 are blocked by the inner plate 34, and thus the inside of each long groove 33 becomes a cooling passage 35.

The plurality of laminate plates 31 are each disposed such that the inner circumferential surface 34i of the inner plate 34 faces an inner circumferential side of the transition piece 20, the outer circumferential surface 32o of the outer plate 32 faces an outer circumferential side of the transition piece 20, and an extending direction of the cooling passage 35 matches the axial direction Da of the transition piece 20, and the ends in the circumferential direction Dc are mutually bonded as described above. A cylinder is formed by bonding the plurality of laminate plates 31. A thermal barrier coating layer 36 is formed on the inner circumferential surface of the cylinder, in other words, the inner circumferential surface 34i of the inner plate 34. An inlet 35i connected to the cooling passage 35 from the outer circumferential surface 32o of the outer plate 32 is formed in the laminate plate 31. Furthermore, an outlet 35o connected to the cooling passage 35 from a surface of the thermal barrier coating layer 36 is formed in the laminate plate 31.

As described above, the combustor 4 is provided inside the gas turbine casing 9, in a space where the compressed air A compressed by the compressor 1 drifts. Therefore, the compressed air A in the gas turbine casing 9 flows as a cooling medium into the cooling passage 35 of the body portion 30 from the inlet 35i formed in the outer circumferential surface 32o of the body portion 30 in the transition piece 20. The compressed air A flows out from the cooling passage 35 to the combustion gas flow path 21 formed on an inner circumferential side of the body portion 30 through the outlet 35o formed in the inner circumferential surface 34i of the body portion 30. Furthermore, the compressed air A flows into the cooling passage 55 of the outlet flange portion 50 from the inlet formed in an outer circumferential surface of the outlet flange portion 50 in the transition piece 20. The compressed air A flows out from the cooling passage 55 to the outside through the outlet formed in the flange end surface of the outlet flange portion 50.

Figure 4:
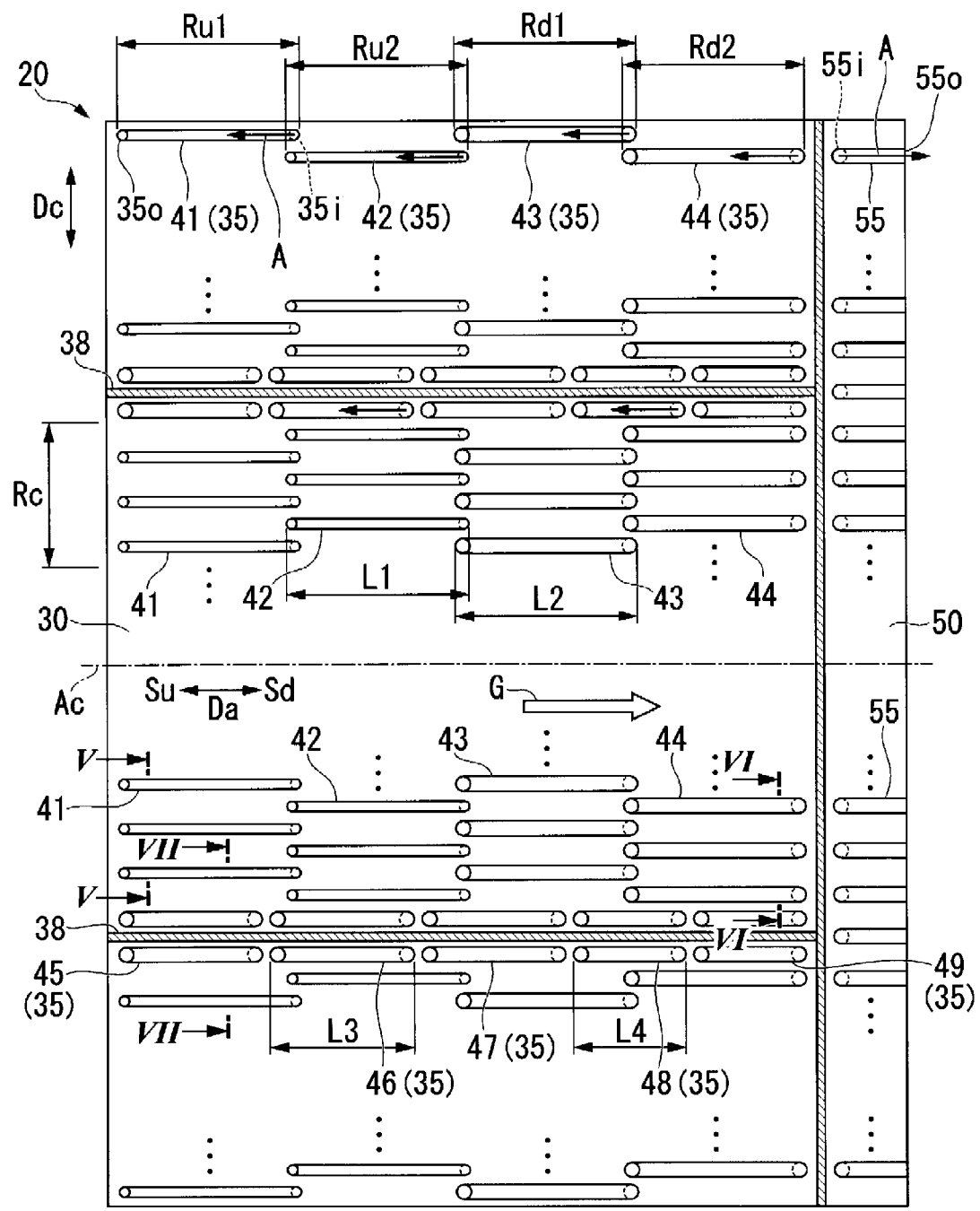
FIG. 4 is a schematic developed view of the transition piece according to the first embodiment of the present invention.

Next, an arrangement of the plurality of cooling passages 35 inside the transition piece 20 is described using FIG. 4. Note that FIG. 4 is a schematic developed view in which the cylindrical transition piece 20 is developed on a plane and viewed from the inner circumferential surface 34i side of the transition piece 20.

As described above, the plurality of cooling passages 35, 55 extending in the axial direction Da are formed in the transition piece 20. The plurality of cooling passages 35, 55 include a plurality of first upstream side passages 41, a plurality of second upstream side passages 42, a plurality of first downstream side passages 43, a plurality of second downstream side passages 44, a plurality of first through fifth bond side passages 45 through 49, and a plurality of outlet flange passages 55. The plurality of outlet flange passages 55 are formed in the outlet flange portion 50 of the transition piece 20. Therefore, the outlet flange passage 55 forms the cooling passage 55 of the outlet flange portion 50. Of the plurality of cooling passages 35, 55, the other passages 41 through 49 excluding the outlet flange passage 55 are all formed in the body portion 30 of the transition piece 20. Therefore, the other passages 41 to 49 form the cooling passages 35 of the body portion 30. A cross-sectional area of each of the plurality of cooling passages 35, 55 is the same at any position in the axial direction Da. However, the cross-sectional areas of the plurality of cooling passages 35 may be different from one another as described later. Similarly, the cross-sectional areas of the plurality of cooling passages 55 also may be different from one another.

The plurality of first upstream side passages 41 are formed so as to be aligned in the circumferential direction Dc in a first upstream side region Ru1 that is most upstream in the body portion 30 in the axial direction Da. The plurality of second upstream side passages 42 are formed so as to be aligned in the circumferential direction Dc in a second upstream side region Ru2 that is on the downstream side Sd with regard to the first upstream side region Ru1. An upstream side portion of the second upstream side region Ru2 overlaps with a downstream side portion of the first upstream side region Ru1 in the axial direction Da. Therefore, an upstream side portion of the second upstream side passage 42 overlaps with a downstream side portion of the first upstream side passage 41 in the axial direction Da, and is shifted therefrom in the circumferential direction Dc.

The plurality of first downstream side passages 43 are formed so as to be aligned in the circumferential direction Dc in a first downstream side region Rd1 that is on the downstream side Sd with regard to the second upstream side region Ru2. An upstream side portion of the first downstream side region Rd1 overlaps with a downstream side portion of the second upstream side region Ru2 in the axial direction Da. Therefore, an upstream side portion of the first downstream side passage 43 overlaps with a downstream side portion of the second upstream side passage 42 in the axial direction Da, and is shifted therefrom in the circumferential direction Dc.

The plurality of second downstream side passages 44 are formed so as to be aligned in the circumferential direction Dc in a second downstream side region Rd2 that is on the downstream side Sd with regard to the first downstream side region Rd1. The second downstream side region Rd2 is a region that is located farthest on the downstream side Sd in the body portion 30. An upstream side portion of the second downstream side region Rd2 overlaps with a downstream side portion of the first downstream side region Rd1 in the axial direction Da. Therefore, an upstream side portion of the second downstream side passage 44 overlaps with a downstream side portion of the first downstream side passage 43 in the axial direction Da, and is shifted therefrom in the circumferential direction Dc.

A bonded portion 38 extending in the axial direction Da is formed in the body portion 30. The bonded portion 38 is formed by mutually bonding the ends of the plurality of laminate plates 31 in the circumferential direction Dc, as described above using FIG. 3. The first to fifth bond side passages 45 to 49 are all provided along the bonded portion 38. The first to fifth bond side passages 45 to 49 are all nearer to the bonded portion 38 than the other passages 41 to 44 in the circumferential direction Dc. The first bond side passage 45, second bond side passage 46, third bond side passage 47, fourth bond side passage 48, and fifth bond side passage 49 are provided in this order so as to be aligned from the upstream side Su to the downstream side Sd of the body portion 30.

The length of the first upstream side passage 41 in the axial direction Da and the length of the second upstream side passage 42 in the axial direction Da are both L1. Note that hereinafter, the length of a passage in the axial direction Da is referred to as a passage length. The passage length of the first downstream side passage 43 and the passage length of the second downstream side passage 44 are both L2. In the present embodiment, the passage length L1 and the passage length L2 are the same. Therefore, the passage length of the first upstream side passage 41, the passage length of the second upstream side passage 42, the passage length of the first downstream side passage 43, and the passage length of the second downstream side passage 44 are mutually the same passage lengths.

The passage lengths of the first bond side passage 45, second bond side passage 46, and third bond side passage 47 are all L3. The passage lengths of the fourth bond side passage 48 and fifth bond side passage 49 provided farther on the downstream side Sd than the bond side passages 45 to 47 are both L4. The passage length L3 is shorter than the passage lengths L1, L2. Furthermore, the passage length L4 is even shorter than the passage length L3. Therefore, the passage lengths L3, L4 of the bond side passages 45 to 49 are both shorter than the passage lengths of the passages 41 to 44 adjacent to the bond side passages 45 to 49 in the circumferential direction Dc.

The cooling passages 35 formed in the body portion 30 each have the inlet 35$i$ formed at a downstream end portion of the cooling passage 35, and the outlet 35$o$ formed at an upstream end portion of the cooling passage 35. Therefore, the compressed air A flows from the downstream side Sd to the upstream side Su of the combustor 4 in the cooling passages 35 formed in the body portion 30. Therefore, the air in the cooling passages 35 flows in a reverse direction from the combustion gas G flowing through the combustion gas flow path 21.

The areas of cross sections orthogonal to the axial direction Da of the first upstream side passage 41 and second upstream side passage 42 are both S1 as illustrated in FIG. 5. Note that hereinafter, the area of a cross section orthogonal to the axial direction Da of a passage is referred to as the passage cross-sectional area. Furthermore, the number of the first upstream side passages 41 and the number of the second upstream side passages 42 provided in a circumferential region of a unit circumferential length Lc are the same.

Figure 6:
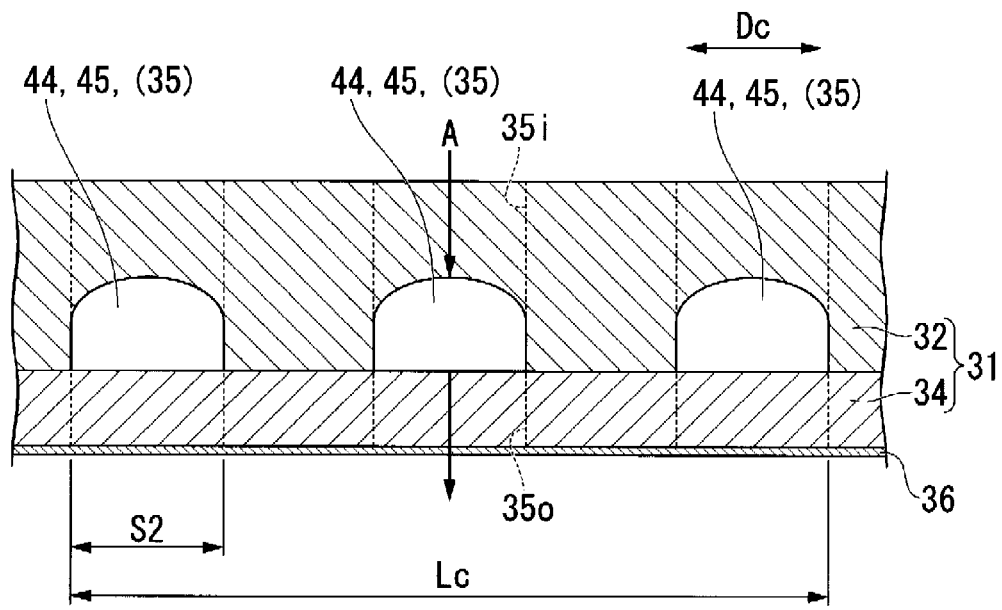
FIG. 6 is a cross-sectional view taken along a line VI-VI in FIG. 4.

The passage cross-sectional areas of the first downstream side passage 43 and second downstream side passage 44 are both S2 as illustrated in FIG. 6. The passage area S2 is larger than the passage area S1. Furthermore, the number of the first downstream side passages 43 and the number of the second downstream side passages 44 provided in a circumferential region of the unit circumferential length Lc are the same.

Therefore, in the present embodiment, the total cross-sectional area per unit circumferential length Lc of the plurality of first downstream side passages 43 provided in the first downstream side region Rd1 within one circumferential region Rc is larger than the total cross-sectional area per unit circumferential length Lc of the plurality of first upstream side passages 41 provided in the first upstream side region Ru1 within the same circumferential region Rc. Similarly, the total cross-sectional area per unit circumferential length Lc of the plurality of first downstream side passages 43 provided in the first downstream side region Rd1 within the same circumferential region Rc is larger than the total cross-sectional area per unit circumferential length Lc of the plurality of second upstream side passages 42 provided in the second upstream side region Ru2 within the same circumferential region Rc. Furthermore, the total cross-sectional area per unit circumferential length Lc of the plurality of second downstream side passages 44 provided in the second downstream side region Rd2 within the same circumferential region Rc is larger than the total cross-sectional area per unit circumferential length Lc of the plurality of first upstream side passages 41 provided in the first upstream side region Ru1 within the same circumferential region Rc. Similarly, the total cross-sectional area per unit circumferential length Lc of the plurality of second downstream side passages 44 provided in the second downstream side region Rd2 within the same circumferential region Rc is larger than the total cross-sectional area per unit circumferential length Lc of the plurality of second upstream side passages 42 provided in the second upstream side region Ru2 within the same circumferential region Rc.

Figure 7:
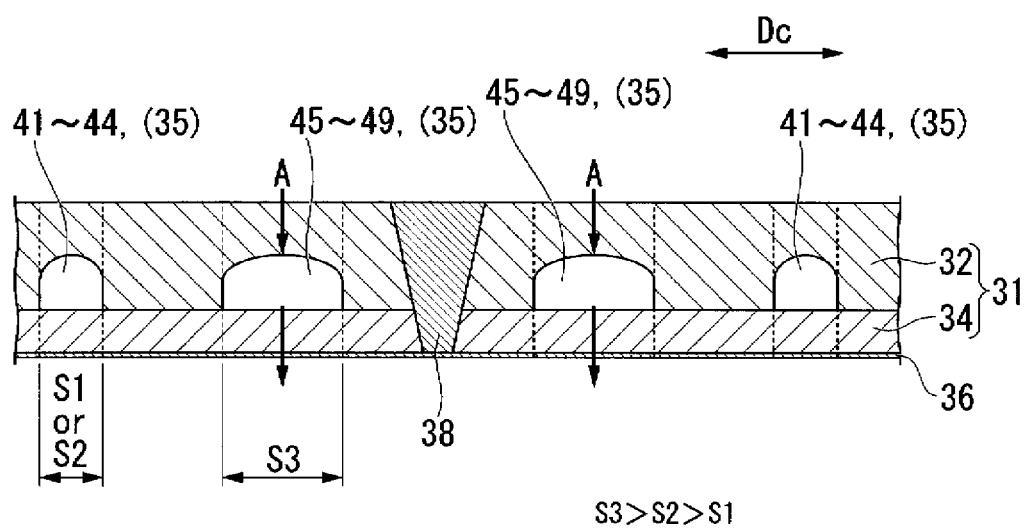
FIG. 7 is a cross-sectional view taken along a line VII-VII in FIG. 4.

As illustrated in FIG. 7, the passage cross-sectional areas of the first to fifth bond side passages 45 to 49 are all S3. The passage cross-sectional area S3 is larger than the passage cross-sectional areas S1, S2. Note that in an example illustrated in FIG. 5 to FIG. 7, heights of the passages are constant, and the passage cross-sectional areas of the passages are varied from one another by varying the widths of the passages. However, the widths of the passages may be constant, and the heights of the passages may be varied in order to vary the passage cross-sectional areas of the passages from one another.

As illustrated in FIG. 4, the cooling passages 55 formed in the outlet flange portion 50, in other words, the outlet flange passages 55 each have an inlet 55$i$ formed at an upstream end of the outlet flange passage 55, and an outlet 55$o$ formed at a downstream end of the outlet flange passage 55. Unlike the outlet 35$o$ of the cooling passage 35 formed in the body portion 30, the outlet 55$o$ is opened in the downstream end surface of the flange 53 as described above. Therefore, as with the combustion gas G, air inside the outlet flange passages 55 formed in the outlet flange portion 50 flows from the upstream side Su to the downstream side Sd of the combustor 4, and flows to the outside from the downstream end surface of the flange 53.

Next, a phenomenon in the transition piece 20 described above, and a function of the transition piece 20 are described.

The fuel F and compressed air A are injected from the plurality of burners 11 of the fuel supply unit into the transition piece 20. The fuel F is combusted in the compressed air A. The high-temperature combustion gas G is generated by combusting the fuel F. The combustion gas G flows to the downstream side Sd through the inside of the transition piece 20, and flows into the combustion gas flow path of the turbine 5.

Combustion of the fuel progresses towards the downstream side Sd. Therefore, the downstream side Sd reaches a higher temperature than the upstream side Su in the combustion gas flow path 21 in the transition piece 20. Therefore, the downstream side Sd of the transition piece 20 is more exposed to high-temperature gas than the upstream side Su. Furthermore, as described above, the combustion gas flow path 21 in the transition piece 20 gradually narrows from the upstream side Su towards the downstream side Sd. Therefore, in the combustion gas flow path 21, the gas flow velocity is higher on the downstream side Sd than the upstream side Su. Therefore, the heat transfer coefficient with gas is higher on the downstream side Sd of the transition piece 20 than the upstream side Su.

As described above, in the transition piece 20, the downstream side Sd is more exposed to high-temperature gas than the upstream side Su, and the downstream side Sd has a higher heat transfer coefficient with gas than the upstream side Su, and therefore, the downstream side Sd is more prone to heating than the upstream side Su.

Therefore, in the present embodiment, air is passed from the downstream side Sd of the combustor 4 to the upstream side Su through the plurality of cooling passages 35 of the body portion 30, and thus portions on the downstream side Sd of the cooling passages 35 are efficiently cooled.

Furthermore, in the present embodiment, as described above, the total cross-sectional area per unit circumferential length Lc of the plurality of downstream side passages 43, 44 provided in the downstream side region Rd within the one circumferential region Rc is larger than the total cross-sectional area per unit circumferential length Lc of the plurality of upstream side passages 41, 42 provided in the upstream side region Ru within the same circumferential region Rc. Therefore, in the present embodiment, the flow rate of air flowing through the downstream side passages 43, 44 is higher than the flow rate of air flowing through the upstream side passages 41, 42, and the cooling performance in the downstream side region Rd is higher than the cooling performance in the upstream side region Ru. On the other hand, in the present embodiment, the flow rate of air flowing through the upstream side passages 41, 42 in the upstream side region Ru that is heated less than the downstream side region Rd is reduced to suppress the cooling performance in the upstream side region Ru.

As illustrated in FIG. 7, of pairs of cooling passages 35 adjacent in the circumferential direction Dc, an interval between a pair of cooling passages 35 with the bonded portion 38 provided between the two cooling passages 35 is wider than an interval between other pairs of cooling passages 35. Therefore, the cooling performance by air per unit circumferential length Lc is lower between the pair of cooling passages 35 between which the bonded portion 38 is provided.

Therefore, in the present embodiment, the passage cross-sectional area S3 of the bond side passages 45 through 49 which are the cooling passages 35 nearest to the bonded portion 38 in the circumferential direction Dc is larger than the passage cross-sectional area S1 or S2 of the other cooling passages 41 to 44 adjacent to the bond side passages 45 to 49 in the circumferential direction Dc. Furthermore, in the present embodiment, as illustrated in FIG. 4, the passage lengths L3 and L4 of the bond side passages 45 through 49 which are the cooling passages 35 nearest to the bonded portion 38 in the circumferential direction Dc are shorter than the passage lengths L1 and L2 of the other cooling passages 41 to 44 adjacent to the bond side passages 45 to 49 in the circumferential direction Dc. When the passage length is short, the heating amount of the cooling medium in a process of flowing through the passage is smaller as compared to when the passage length is long. Therefore, the temperature of the cooling medium is lower, and thus the cooling performance thereof is higher, in a cooling passage with a short passage length where the heating amount of the cooling medium is smaller, than in a cooling passage with a long passage length. Therefore, in the present embodiment, the cooling performance of the bond side passage 45 to 49 can be enhanced, and an area between pairs of cooling passages 45 to 49 between which the bonded portion 38 is provided can be cooled as equally well as areas between other pairs of cooling passages 41 to 44.

Therefore, in the present embodiment, the entire transition piece 20 can be at a fixed temperature or lower, a uniform temperature can be achieved, and the durability of the transition piece 20 can be ensured. Furthermore, in the present embodiment, while the flow rate of the cooling medium flowing through the cooling passage 35 in a region where the heating amount is large is increased, the flow rate of the cooling medium flowing through the cooling passage 35 in a region where the heating amount is small is reduced, and therefore, the flow rate of the cooling medium can be suppressed overall.

Note that in the present embodiment, the passage cross-sectional area of the first upstream side passage 41 and the passage cross-sectional area of the second upstream side passage 42 are the same. However, the passage cross-sectional area of the second upstream side passage 42 may be larger than the passage cross-sectional area of the first upstream side passage 41. Furthermore, the passage cross-sectional area of the first downstream side passage 43 and the passage cross-sectional area of the second downstream side passage 44 are the same. However, the passage cross-sectional area of the second downstream side passage 44 may be larger than the passage cross-sectional area of the first downstream side passage 43.

Furthermore, in the present embodiment, the upstream side portion of the second upstream side passage 42 overlaps with the downstream side portion of the first upstream side passage 41 in the axial direction Da. The upstream side portion of the first downstream side passage 43 overlaps with the downstream side portion of the second upstream side passage 42 in the axial direction Da. The upstream side portion of the second downstream side passage 44 overlaps with the downstream side portion of the first downstream side passage 43 in the axial direction Da. However, the cooling passages 41 to 44 may not overlap in the axial direction Da.

Second Embodiment of Transition Piece

Figure 8:
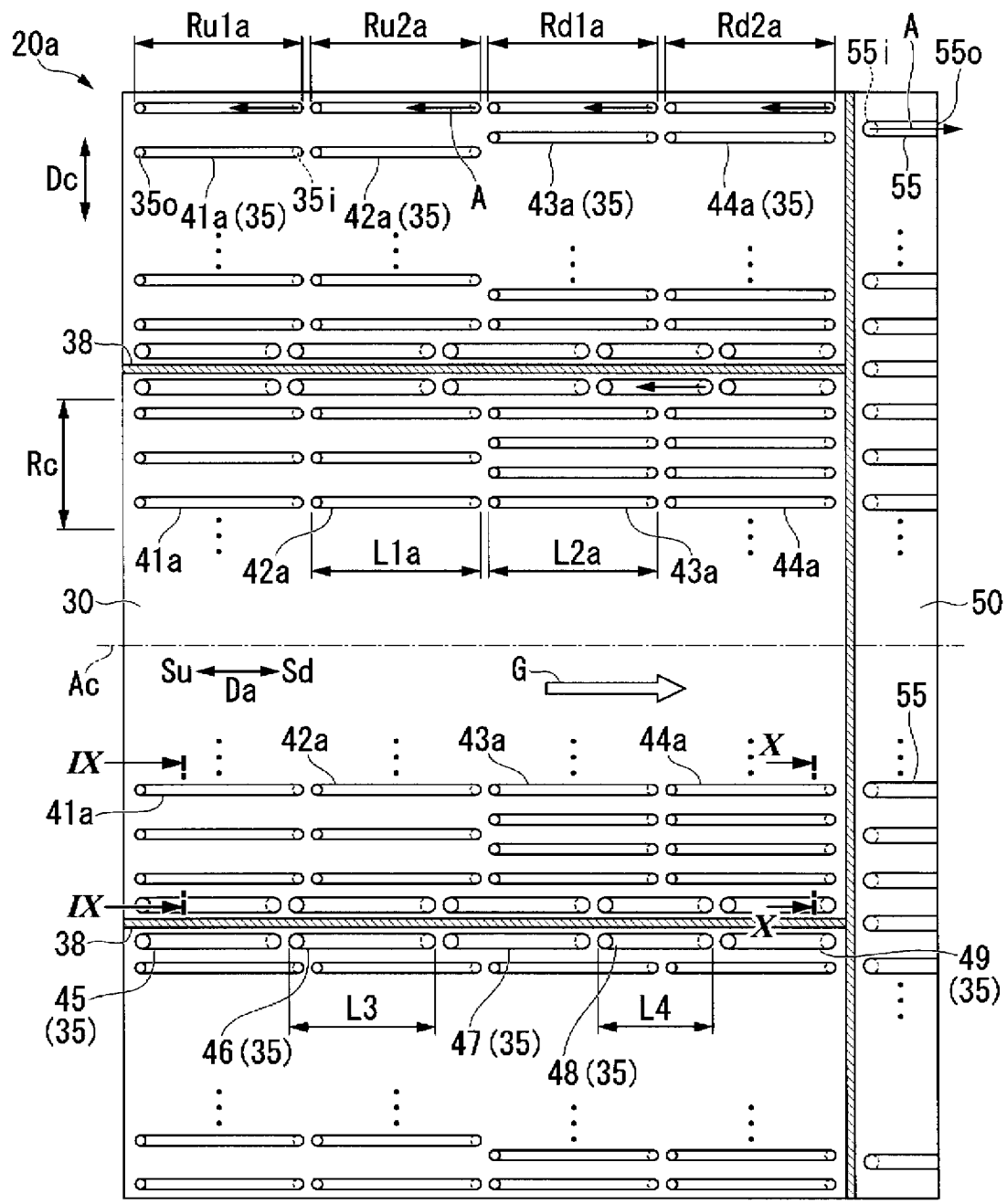
FIG. 8 is a schematic developed view of a transition piece according to a second embodiment of the present invention.
Figure 9:
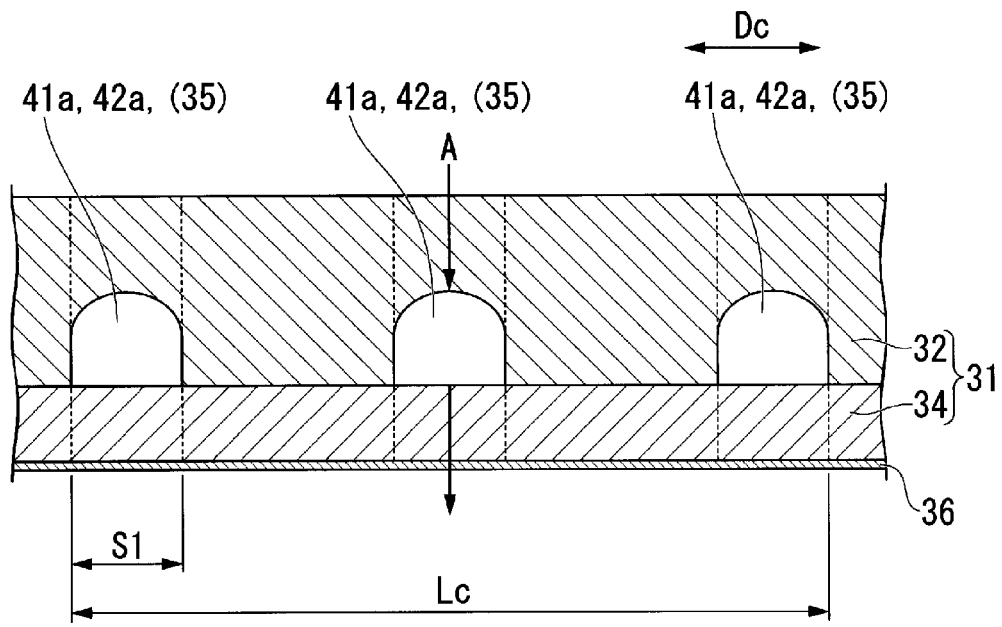
FIG. 9 is a cross-sectional view taken along a line IX-IX in FIG. 8.
Figure 10:
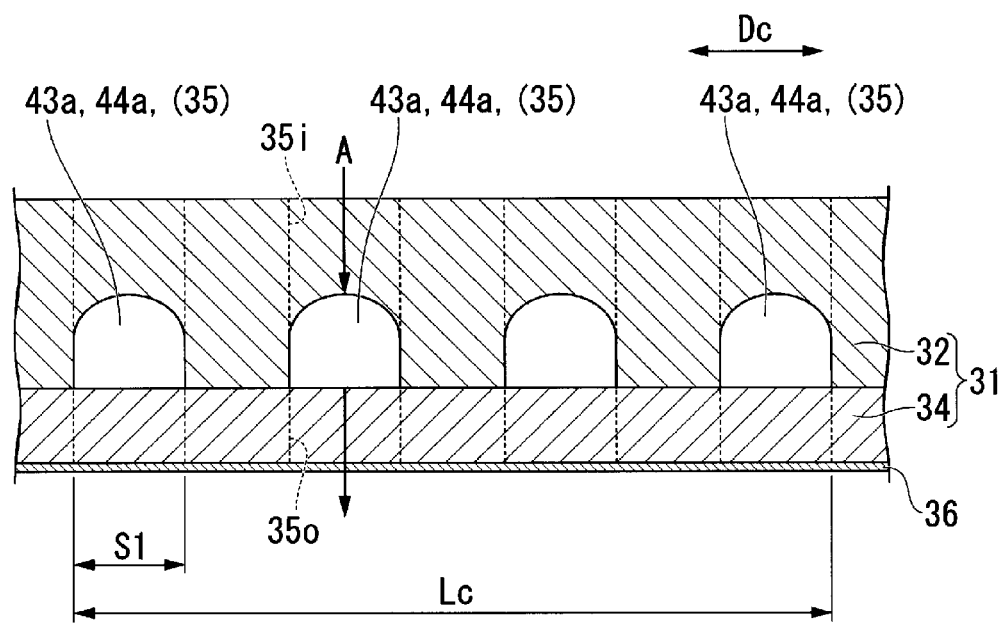
FIG. 10 is a cross-sectional view taken along a line X-X in FIG. 8.

A second embodiment of the transition piece is described while referring to FIG. 8 to FIG. 10.

In the transition piece 20 of the first embodiment, the passage cross-sectional area of the downstream side passages 43, 44 is larger than the passage cross-sectional area of the upstream side passages 41, 42. On the other hand, in a transition piece 20a of the present embodiment, as illustrated in FIG. 8, the passage cross-sectional area of downstream side passages 43a, 44a and the passage cross-sectional area of upstream side passages 41a, 42a are the same, but the number of the downstream side passages 43a, 44a per unit circumferential length Lc is higher than the number of the upstream side passages 41a, 42a per unit circumferential length Lc. The transition piece 20a of the present embodiment is different from the first embodiment on this point, but the configuration is otherwise the same as that of the first embodiment.

A plurality of first upstream side passages 41a, a plurality of second upstream side passages 42a, a plurality of first downstream side passages 43a, a plurality of second downstream side passages 44a, a plurality of first through fifth bond side passages 45 through 49, and a plurality of outlet flange passages 55 are also formed in the transition piece 20a of the present embodiment, similarly to the transition piece 20 of the first embodiment.

A passage length of the first upstream side passage 41a and a passage length of the second upstream side passage 42a are both L1a. A passage length of the first downstream side passage 43a and a passage length of the second downstream side passage 44a are both L2a. In the present embodiment, the passage length L1a and the passage length L2a are the same.

Passage cross-sectional areas of the first upstream side passage 41a and second upstream side passage 42a are both S1 as illustrated in FIG. 9. Furthermore, passage cross-sectional areas of the first downstream side passage 43a and second downstream side passage 44a are S1, which is the same as the passage cross-sectional areas of the first upstream side passage 41a and second upstream side passage 42a, as illustrated in FIG. 10. However, the number of the first downstream side passages 43a and second downstream side passages 44a per unit circumferential length Lc is higher than the number of the first upstream side passages 41a and second upstream side passages 42a per unit circumferential length Lc.

Therefore, in the present embodiment, too, the total cross-sectional area per unit circumferential length Lc of the plurality of first downstream side passages 43a provided in a first downstream side region Rd1a within one circumferential region Rc is larger than the total cross-sectional area per unit circumferential length Lc of the plurality of first upstream side passages 41a provided in a first upstream side region Ru1a within the same circumferential region Rc, similarly to the first embodiment. Similarly, the total cross-sectional area per unit circumferential length Lc of the plurality of first downstream side passages 43a provided in the first downstream side region Rd1a within the same circumferential region Rc is larger than the total cross-sectional area per unit circumferential length Lc of the plurality of second upstream side passages 42a provided in a second upstream side region Ru2a within the same circumferential region Rc. Furthermore, the total cross-sectional area per unit circumferential length Lc of the plurality of second downstream side passages 44a provided in a second downstream side region Rd2a within the same circumferential region Rc is larger than the total cross-sectional area per unit circumferential length Lc of the plurality of first upstream side passages 41a provided in the first upstream side region Ru1a within the same circumferential region Rc. Similarly, the total cross-sectional area per unit circumferential length Lc of the plurality of second downstream side passages 44a provided in the second downstream side region Rd2a within the same circumferential region Rc is larger than the total cross-sectional area per unit circumferential length Lc of the plurality of second upstream side passages 42a provided in the second upstream side region Ru2a within the same circumferential region Rc.

Next, a function of the transition piece 20a of the present embodiment is described.

As described above, in the transition piece, the downstream side Sd is more exposed to high-temperature gas than the upstream side Su, and the downstream side Sd has a higher heat transfer coefficient with gas than the upstream side Su, and therefore, the downstream side Sd is more prone to heating than the upstream side Su.

Therefore, in the present embodiment, the number of the downstream side passages 43a, 44a per unit circumferential length Lc is increased to make the total cross-sectional area per unit circumferential length Lc of the plurality of downstream side passages 43a, 44a provided in the downstream side region Rda within the one circumferential region Rc larger than the total cross-sectional area per unit circumferential length Lc of the plurality of upstream side passages 41a, 42a provided in the upstream side region Rua within the same circumferential region Rc. Therefore, in the present embodiment, the total flow rate of air flowing through the downstream side passages 43a, 44a in the downstream side region Rda is higher than the total flow rate of air flowing through the upstream side passages 41a, 42a in the upstream side region Rua, and thus the cooling performance in the downstream side region Rda is higher than the cooling performance in the upstream side region Rua. On the other hand, in the present embodiment, the total flow rate of air flowing through the upstream side passages 41a, 42a in the upstream side region Rua that is heated less than the downstream side region Rda is reduced to suppress the cooling performance in the upstream side region Rua.

Therefore, in the present embodiment, too, the durability of the transition piece 20a can be ensured, and the flow rate of the cooling medium can be suppressed.

Note that in the present embodiment, the number of the first upstream side passages 41a and the number of the second upstream side passages 42a per unit circumferential length Lc are the same. However, the number of the second upstream side passages 42a per unit circumferential length Lc may be higher than the number of the first upstream side passages 41a. Furthermore, the number of the first downstream side passages 43a and the number of the second downstream side passages 44a per unit circumferential length Lc are the same. However, the number of the second downstream side passages 44a per unit circumferential length Lc may be higher than the number of the first downstream side passages 43a.

Furthermore, in the present embodiment, the passage cross-sectional area of the first downstream side passage 43a and second downstream side passage 44a may be larger than the passage cross-sectional area of the first upstream side passage 41a and second upstream side passage 42a, similarly to the first embodiment.

Third Embodiment of Transition Piece

Figure 11:
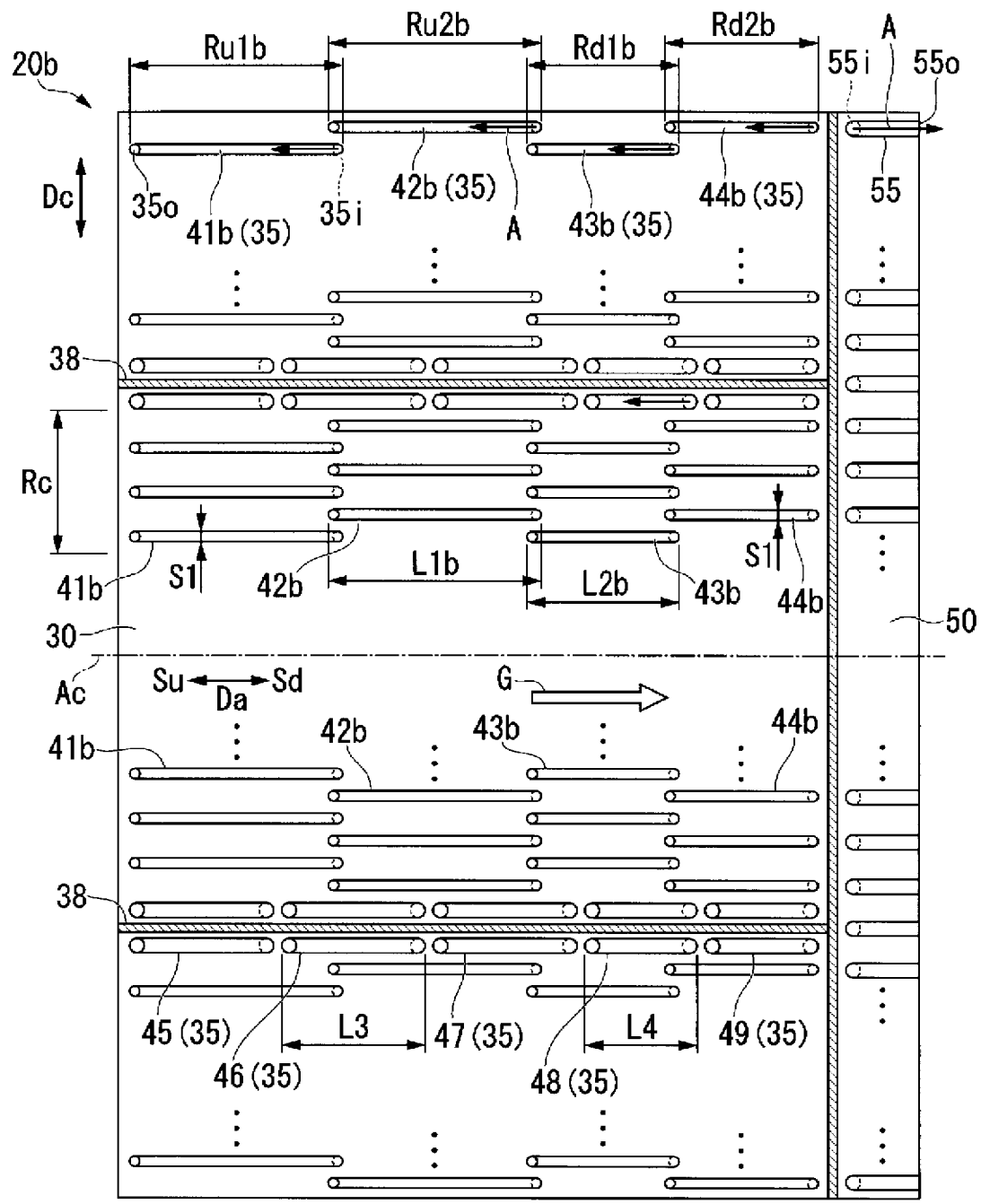
FIG. 11 is a schematic developed view of a transition piece according to a third embodiment of the present invention.

A third embodiment of the transition piece is described while referring to FIG. 11.

In the transition piece 20 of the first embodiment, the passage cross-sectional area of the downstream side passages 43, 44 is larger than the passage cross-sectional area of the upstream side passages 41, 42. On the other hand, in a transition piece 20b of the present embodiment, a passage cross-sectional area of downstream side passages 43b, 44b and a passage cross-sectional area of upstream side passages 41b, 42b are the same, but a passage length of the downstream side passages 43b, 44b is shorter than a passage length of the upstream side passages 41b, 42b. The transition piece 20b of the present embodiment is different from the first embodiment on this point, but the configuration is otherwise the same as that of the first embodiment.

A plurality of first upstream side passages 41b, a plurality of second upstream side passages 42b, a plurality of first downstream side passages 43b, a plurality of second downstream side passages 44b, a plurality of first through fifth bond side passages 45 through 49, and a plurality of outlet flange passages 55 are also formed in the transition piece 20b of the present embodiment, similarly to the transition piece 20 of the first embodiment.

The passage length of the first upstream side passage 41b and the passage length of the second upstream side passage 42b are both L1b. The passage length of the first downstream side passage 43b and the passage length of the second downstream side passage 44b are both L2b. In the present embodiment, the passage length L2b is shorter than the passage length L1b.

Similarly to the first embodiment, the passage lengths of the first bond side passage 45, second bond side passage 46, and third bond side passage 47 are all L3. The passage lengths of the fourth bond side passage 48 and fifth bond side passage 49 provided farther on the downstream side Sd than the bond side passages 45 to 47 are both L4. The passage length L3 is shorter than passage lengths L1b. Furthermore, the passage length L4 is shorter than the passage length L3 and the passage length L2b. Therefore, the passage lengths of the bond side passages 45 to 49 are both shorter than the passage lengths of all the passages adjacent to the bond side passages 45 to 49 in the circumferential direction Dc. Note that so long as the passage length L3 is shorter than the passage length L1b, the passage length L3 may be longer than the passage length L2b or shorter than the passage length L2b.

The passage cross-sectional areas of the first upstream side passage 41b, second upstream side passage 42b, first downstream side passage 43b, and second downstream side passage 44b are all S1. Furthermore, the number of the first downstream side passages 43b, number of the second downstream side passages 44b, number of the first upstream side passages 41b, and number of the second upstream side passages 42b per unit circumferential length Lc are mutually the same, similarly to the first embodiment.

Therefore, in the present embodiment, a ratio (S1/L2b) of the passage cross-sectional area S1 to the passage length L2b of the downstream side passages 43b, 44b provided in downstream side regions Rd1b, Rd2b within one circumferential region Rc is larger than a ratio (S1/L1b) of the passage cross-sectional area S1 to the passage length L1b of the upstream side passages 41b, 42b provided in upstream side regions Ru1b, Ru2b within the same circumferential region Rc.

Next, a function of the transition piece 20b of the present embodiment is described.

Again, in the transition piece, the downstream side Sd is more exposed to high-temperature gas than the upstream side Su, and the downstream side Sd has a higher heat transfer coefficient with gas than the upstream side Su, and therefore, the downstream side Sd is more prone to heating than the upstream side Su.

As described above, the cooling performance of a cooling passage with a short passage length is higher than that of a cooling passage with a long passage length. Therefore, in the present embodiment, the passage length L2b of the downstream side passages 43b, 44b is shorter than the passage length L1b of the upstream side passages 41b, 42b.

Therefore, in the present embodiment, too, the durability of the transition piece 20b can be ensured, and the flow rate of the cooling medium can be suppressed.

Note that in the present embodiment, a method of making the passage length L2b of the downstream side passages 43b, 44b shorter than the passage length L1b of the upstream side passages 41b, 42b is used as a method of increasing the ratio (S1/L2b) of the passage cross-sectional area S1 to the passage length L2b of the downstream side passages 43b, 44b provided in the downstream side regions Rd1b, Rd2b within the one circumferential region Rc. However, even if a method of making the passage cross-sectional area of the downstream side passages 43b, 44b larger than the passage cross-sectional area of the upstream side passages 41b, 42b is used, the ratio of the passage cross-sectional area to the passage length of the downstream side passages 43b, 44b provided in the downstream side regions Rd1b, Rd2b within the one circumferential region Rc can be increased. Therefore, the first embodiment can be said to have a ratio (S2/L2) of the passage cross-sectional area S2 to the passage length L2 of the downstream side passages 43, 44 provided in the downstream side region Rd within the one circumferential region Rc that is larger than a ratio (S1/L1) of the passage cross-sectional area S1 to the passage length L1 of the upstream side passages 41, 42 provided in the upstream side region Ru within the same circumferential region Rc.

In the present embodiment, the passage length of the first upstream side passage 41b and the passage length of the second upstream side passage 42b are the same. However, the passage length of the second upstream side passage 42b may be shorter than the passage length of the first upstream side passage 41b. Furthermore, in the present embodiment, the passage length of the first downstream side passage 43b and the passage length of the second downstream side passage 44b are the same. However, the passage length of the second downstream side passage 44b may be shorter than the passage length of the first downstream side passage 43b.

Furthermore, in the present embodiment, too, the passage cross-sectional area of the first downstream side passage 43b and second downstream side passage 44b may be larger than the passage cross-sectional area of the first upstream side passage 41b and second upstream side passage 42b, similarly to the first embodiment. Furthermore, in the present embodiment, too, the number of the first downstream side passages 43b and second downstream side passages 44b may be higher than the number of the first upstream side passages 41b and second upstream side passages 42b, similarly to the second embodiment.

Fourth Embodiment of Transition Piece

Figure 12:
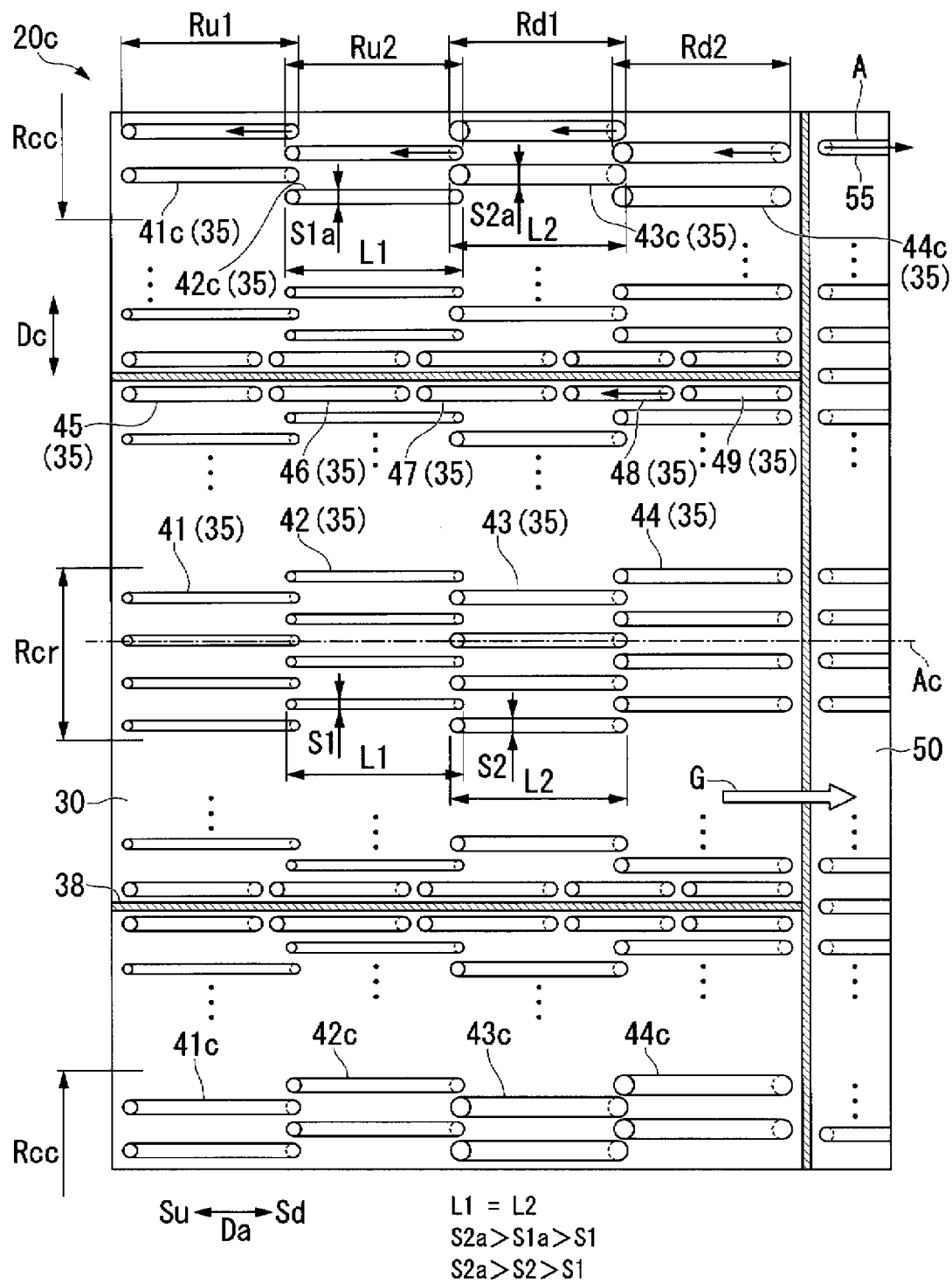
FIG. 12 is a schematic developed view of a transition piece according to a fourth embodiment of the present invention.
Figure 13:
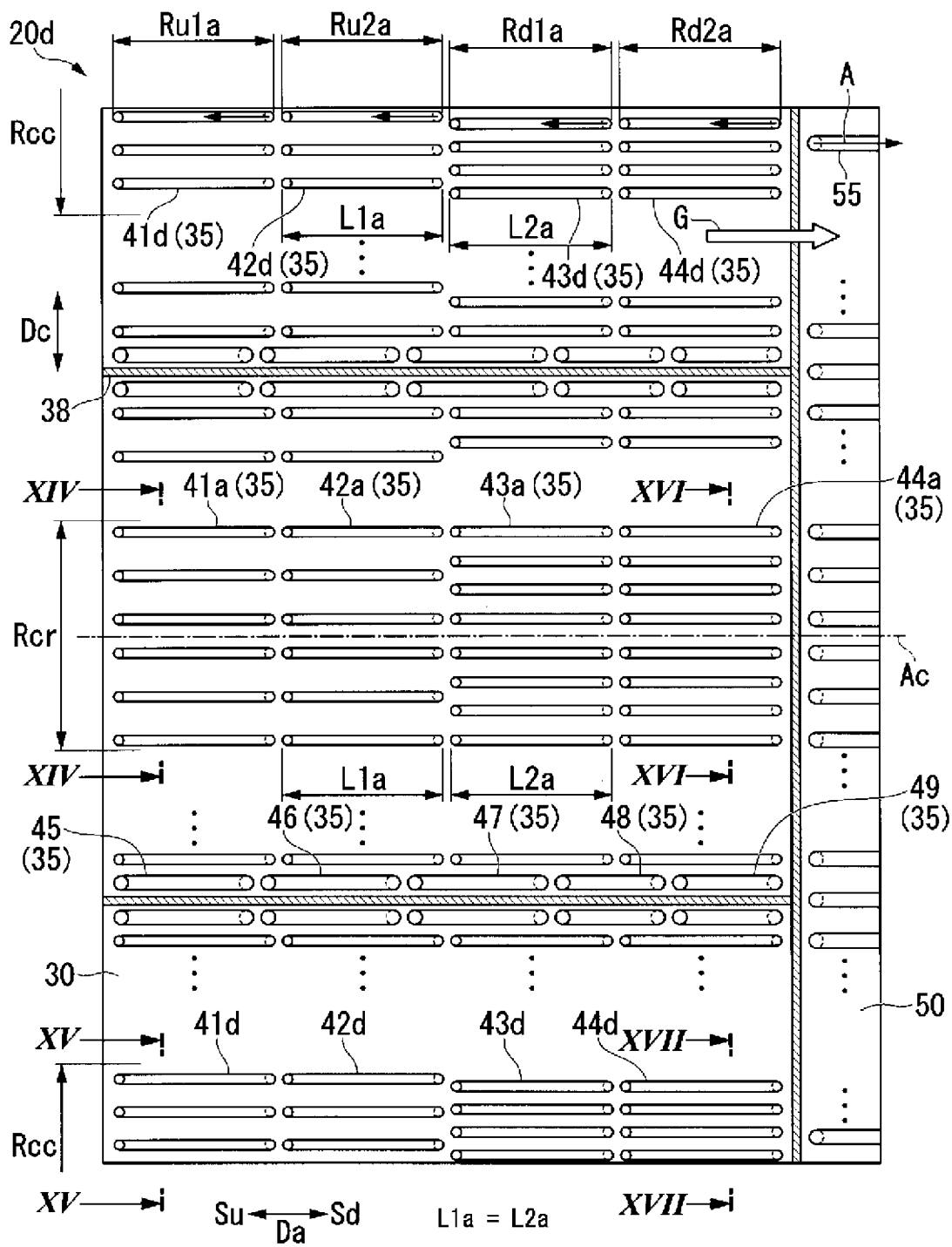
FIG. 13 is a schematic developed view of a transition piece according to a fifth embodiment of the present invention.
Figure 14:
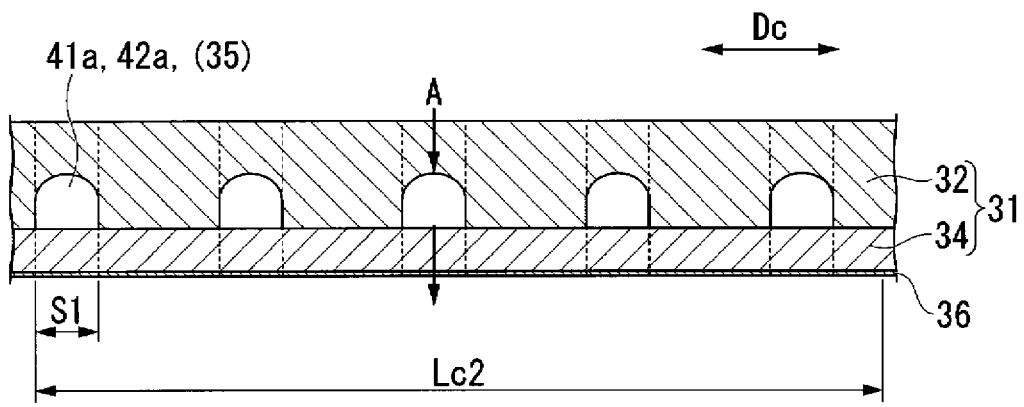
FIG. 14 is a cross-sectional view taken along a line XIV-XIV in FIG. 13.
Figure 15:
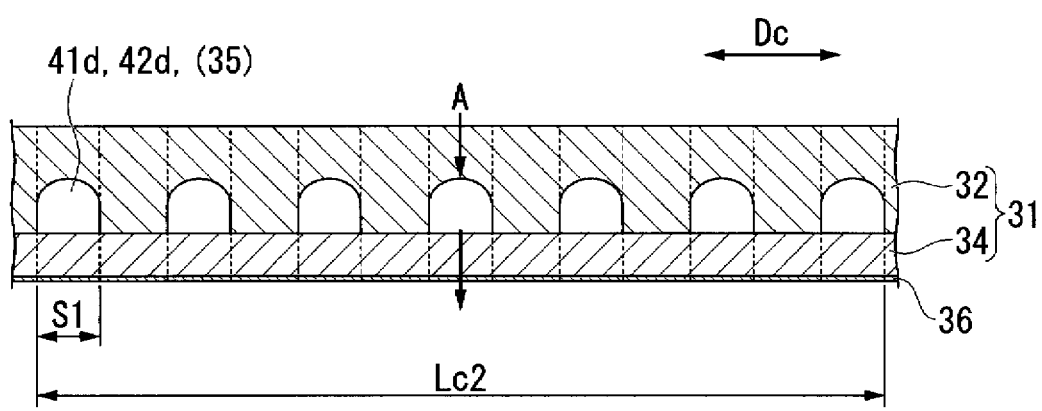
FIG. 15 is a cross-sectional view taken along a line XV-XV in FIG. 13.
Figure 16:
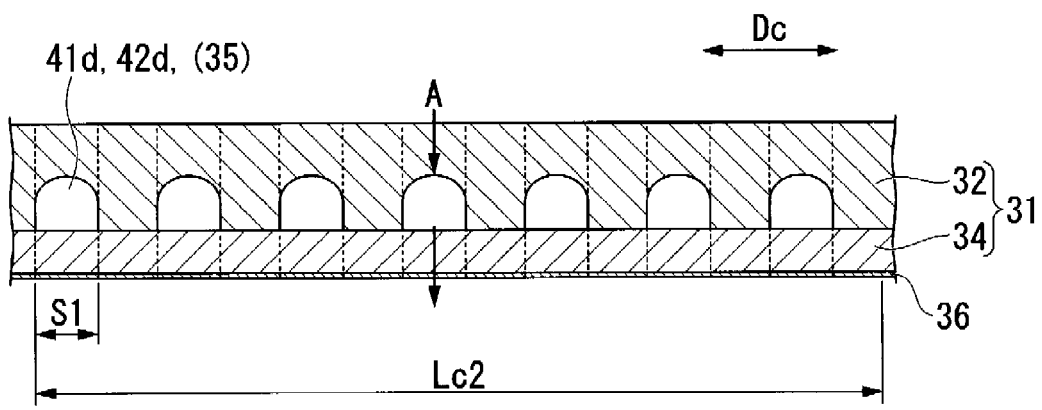
FIG. 16 is a cross-sectional view taking along a line XVI-XVI in FIG. 13.
Figure 17:
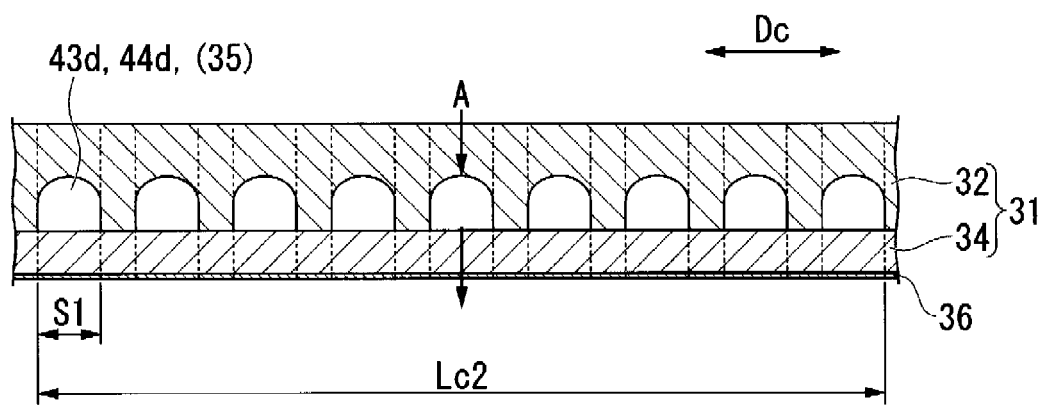
FIG. 17 is a cross-sectional view taking along a line XVII-XVII in FIG. 13.

A fourth embodiment of the transition piece is described while referring to FIG. 12.

As described above using FIG. 2 and FIG. 3, the rotor side region Rcr opposite from the gas turbine rotor 8 and the casing side region Rcc opposite from the inner circumferential surface of the gas turbine casing 9 are provided in the transition piece 20. A discharge opening 1o of the compressor 1 is present on an inner side in a radial direction of the transition piece 20, in a radial direction based on the rotational axis Ar of the gas turbine. Therefore, the compressed air A at a high flow velocity immediately after flowing out from the compressor 1 is directly blown onto the rotor side region Rcr of the transition piece 20. On the other hand, the compressed air A is stagnant on an outer side in the radial direction of the transition piece 20, and therefore, the flow velocity of the compressed air A is low. Therefore, the heat transfer coefficient between the transition piece 20 and the compressed air A that is present on an outer circumferential side of the transition piece 20 is higher in the rotor side region Rcr and lower in the casing side region Rcc, of the regions in the circumferential direction Dc in the transition piece 20. As a result, the cooling effect on the transition piece 20 exerted by the compressed air A that is present on the outer circumferential side of the transition piece 20 is higher in the rotor side region Rcr and lower in the casing side region Rcc, of the regions in the circumferential direction Dc in the transition piece 20.

Therefore, in a transition piece 20c of the present embodiment, a passage cross-sectional area of the cooling passage 35 in the casing side region Rcc is larger than a passage cross-sectional area of the cooling passage 35 in the rotor side region Rcr. The transition piece 20c of the present embodiment is different from the first embodiment on this point, but the configuration is otherwise the same as that of the first embodiment. Therefore, an effect that is basically similar to that of the first embodiment is also achieved in the present embodiment.

A plurality of first upstream side passages 41, 41c, a plurality of second upstream side passages 42, 42c, a plurality of first downstream side passages 43, 43c, a plurality of second downstream side passages 44, 44c, a plurality of first through fifth bond side passages 45 to 49, and a plurality of outlet flange passages 55 are also formed in the transition piece 20c of the present embodiment, similarly to the transition piece 20 of the first embodiment.

In the present embodiment, the first upstream side passages 41, 41c include a first upstream casing side passage 41c present in the casing side region Rcc, and a first upstream rotor side passage 41 present in a region including the rotor side region Rcr but excluding the casing side region Rcc. Similarly, the second upstream side passages 42, 42c include a second upstream casing side passage 42c present in the casing side region Rcc, and a second upstream rotor side passage 42 present in a region including the rotor side region Rcr but excluding the casing side region Rcc. Furthermore, the first downstream side passages 43, 43c include a first downstream casing side passage 43c present in the casing side region Rcc, and a first downstream rotor side passage 43 present in a region including the rotor side region Rcr but excluding the casing side region Rcc. Similarly, the second downstream side passages 44, 44c include a second downstream casing side passage 44c present in the casing side region Rcc, and a second downstream rotor side passage 44 present in a region including the rotor side region Rcr but excluding the casing side region Rcc.

A passage length of the first upstream casing side passage 41c, passage length of the first upstream rotor side passage 41, passage length of the second upstream casing side passage 42c, and passage length of the second upstream rotor side passage 42 are all L1, similarly to the first embodiment. Furthermore, a passage length of the first downstream casing side passage 43c, passage length of the first downstream rotor side passage 43, passage length of the second downstream casing side passage 44c, and passage length of the second downstream rotor side passage 44 are all L2. In the present embodiment, too, the passage length L1 and the passage length L2 are the same. Furthermore, the number of the first upstream casing side passages 41c, number of the first upstream rotor side passages 41, number of the second upstream casing side passages 42c, and number of the second upstream rotor side passages 42 per unit circumferential length Lc are mutually the same.

A passage cross-sectional area of the first upstream rotor side passage 41 and second upstream rotor side passage 42 is S1, which is the same as the passage cross-sectional area of the first upstream side passage 41 and second upstream side passage 42 of the first embodiment. A passage cross-sectional area of the first downstream rotor side passage 43 and second downstream rotor side passage 44 is S2, which is the same as the passage cross-sectional area of the first downstream side passage 43 and second downstream side passage 44 of the first embodiment. Therefore, the passage cross-sectional area S2 of the first downstream rotor side passage 43 and second downstream rotor side passage 44 is larger than the passage cross-sectional area S1 of the first upstream rotor side passage 41 and second upstream rotor side passage 42.

The passage cross-sectional area of the first upstream casing side passage 41c and second upstream casing side passage 42c is S1a, which is larger than the passage cross-sectional area S1 of the first upstream rotor side passage 41 and second upstream rotor side passage 42. The passage cross-sectional area of the first downstream casing side passage 43c and second downstream casing side passage 44c is S2a, which is larger than the passage cross-sectional area S2 of the first downstream rotor side passage 43 and second downstream rotor side passage 44. The passage cross-sectional area S2a of the first downstream casing side passage 43c and second downstream casing side passage 44c is larger than the passage cross-sectional area S1a of the first upstream casing side passage 41c and second upstream casing side passage 42c. Note that so long as the passage cross-sectional area S1a of the first upstream casing side passage 41c and second upstream casing side passage 42c is larger than the passage cross-sectional area S1 of the first upstream rotor side passage 41 and second upstream rotor side passage 42 and smaller than the passage cross-sectional area S2a of the first downstream casing side passage 43c and second downstream casing side passage 44c, the cross-sectional area S1a may be larger or smaller than the passage cross-sectional area S2 of the first downstream rotor side passage 43 and second downstream rotor side passage 44.

Therefore, in the present embodiment, the total cross-sectional area per unit circumferential length Lc of the plurality of first downstream casing side passages 43c provided in the casing side region Rcc within the first downstream side region Rd1 which is one region in the axial direction Da is larger than the total cross-sectional area per unit circumferential length Lc of the plurality of first downstream rotor side passages 43 provided in the rotor side region Rcr within the first downstream side region Rd1. Similarly, the total cross-sectional area per unit circumferential length Lc of the plurality of second downstream casing side passages 44c provided in the casing side region Rcc within the second downstream side region Rd2 which is one region in the axial direction Da is larger than the total cross-sectional area per unit circumferential length Lc of the plurality of second downstream rotor side passages 44 provided in the rotor side region Rcr within the second downstream side region Rd2. Furthermore, in the present embodiment, the total cross-sectional area per unit circumferential length Lc of the plurality of first upstream casing side passages 41c provided in the casing side region Rcc within the first upstream side region Ru1 which is one region in the axial direction Da is larger than the total cross-sectional area per unit circumferential length Lc of the plurality of first upstream rotor side passages 41 provided in the rotor side region Rcr within the first upstream side region Ru1. Similarly, the total cross-sectional area per unit circumferential length Lc of the plurality of second upstream casing side passages 42c provided in the casing side region Rcc within the second upstream side region Ru2 which is one region in the axial direction Da is larger than the total cross-sectional area per unit circumferential length Lc of the plurality of second upstream rotor side passages 42 provided in the rotor side region Rcr within the second upstream side region Ru2.

Therefore, in the present embodiment, the flow rate of air flowing through the cooling passage 35 in the casing side region Rcc is higher than the flow rate of air flowing through the cooling passage 35 in the rotor side region Rcr, and the cooling performance in the casing side region Rcc is higher than the cooling performance in the rotor side region Rcr. Therefore, in the present embodiment, the durability of the transition piece 20c can be further improved, and the flow rate of the cooling medium can be further suppressed, as compared to the first embodiment.

Fifth Embodiment of Transition Piece

A fifth embodiment of the transition piece is described while referring to FIG. 13 to FIG. 17.

In the transition piece 20c of the fourth embodiment, the passage cross-sectional area of the cooling passage 35 in the casing side region Rcc is larger than the passage cross-sectional area of the cooling passage 35 in the rotor side region Rcr. On the other hand, in a transition piece 20d of the present embodiment, a passage cross-sectional area of the cooling passage 35 in the casing side region Rcc and a passage cross-sectional area of the cooling passage 35 in the rotor side region Rcr are the same, but the number of the cooling passages 35 in the casing side region Rcc per unit circumferential length Lc is higher than the number of the cooling passages 35 in the rotor side region Rcr per unit circumferential length Lc. The transition piece 20d of the present embodiment is different from the fourth embodiment in this point, but the configuration is otherwise the same as that of the fourth embodiment.

A plurality of first upstream casing side passages 41d, plurality of first upstream rotor side passages 41a, plurality of second upstream casing side passages 42d, plurality of second upstream rotor side passages 42a, plurality of first downstream casing side passages 43d, plurality of first downstream rotor side passages 43a, plurality of second downstream casing side passages 44d, plurality of second downstream rotor side passages 44a, plurality of first through fifth bond side passages 45 through 49, and plurality of outlet flange passages 55 are also formed in the transition piece 20d of the present embodiment, similarly to the transition piece 20c of the fourth embodiment.

A passage length of the first upstream casing side passage 41d, passage length of the first upstream rotor side passage 41a, passage length of the second upstream casing side passage 42d, and passage length of the second upstream rotor side passage 42a are all L1a, similarly to the second embodiment. Furthermore, a passage length of the first downstream casing side passage 43d, passage length of the first downstream rotor side passage 43a, passage length of the second downstream casing side passage 44d, and passage length of the second downstream rotor side passage 44a are all L2a, similarly to the second embodiment. In the present embodiment, too, the passage length L1a and the passage length L2a are the same, similarly to the second embodiment.

A passage cross-sectional area of the first upstream casing side passage 41d, passage cross-sectional area of the first upstream rotor side passage 41a, passage cross-sectional area of the second upstream casing side passage 42d, passage cross-sectional area of the second upstream rotor side passage 42a, passage cross-sectional area of the first downstream casing side passage 43d, passage cross-sectional area of the first downstream rotor side passage 43a, passage cross-sectional area of the second downstream casing side passage 44d, and passage cross-sectional area of the second downstream rotor side passage 44a are all S1 as illustrated in in FIG. 14 to FIG. 17. However, the number of the first downstream rotor side passages 43a and second downstream rotor side passages 44a per unit circumferential length Lc2 is higher than the number of the first upstream rotor side passages 41a and second upstream rotor side passage 42a per unit circumferential length Lc2 (refer to FIG. 14 and FIG. 16), similarly to the second embodiment. Furthermore, the number of the first downstream casing side passages 43d and second downstream casing side passages 44d per unit circumferential length Lc2 is higher than the number of the first upstream casing side passages 41d and second upstream casing side passages 42d per unit circumferential length Lc2 (refer to FIG. 15 and FIG. 17). Furthermore, in the present embodiment, the number of the first upstream casing side passages 41d and second upstream casing side passages 42d per unit circumferential length Lc2 is higher than the number of the first upstream rotor side passages 41a and second upstream rotor side passages 42a per unit circumferential length Lc2 (refer to FIG. 14 and FIG. 15). Furthermore, the number of the first downstream casing side passages 43d and second downstream casing side passages 44d per unit circumferential length Lc2 is higher than the number of the first downstream rotor side passages 43a and second downstream rotor side passages 44a per unit circumferential length Lc2 (refer to FIG. 16 and FIG. 17).

Therefore, in the present embodiment, too, the total cross-sectional area per unit circumferential length Lc2 of the plurality of first downstream casing side passages 43d provided in the casing side region Rcc within the first downstream side region Rd1a is larger than the total cross-sectional area per unit circumferential length Lc2 of the plurality of first downstream rotor side passages 43a provided in the rotor side region Rcr within the first downstream side region Rd1a, similarly to the fourth embodiment. Similarly, the total cross-sectional area per unit circumferential length Lc2 of the plurality of second downstream casing side passages 44d provided in the casing side region Rcc within the second downstream side region Rd2a is larger than the total cross-sectional area per unit circumferential length Lc2 of the plurality of second downstream rotor side passages 44a provided in the rotor side region Rcr within the second downstream side region Rd2a. Furthermore, in the present embodiment, the total cross-sectional area per unit circumferential length Lc2 of the plurality of first upstream casing side passages 41d provided in the casing side region Rcc within the first upstream side region Ru1a is larger than the total cross-sectional area per unit circumferential length Lc2 of the plurality of first upstream rotor side passages 41a provided in the rotor side region Rcr within the first upstream side region Ru1a. Similarly, the total cross-sectional area per unit circumferential length Lc2 of the plurality of second upstream casing side passages 42d provided in the casing side region Rcc within the second upstream side region Ru2a is larger than the total cross-sectional area per unit circumferential length Lc of the plurality of second upstream rotor side passages 42a provided in the rotor side region Rcr within the second upstream side region Ru2a.

Therefore, in the present embodiment, too, the flow rate of air flowing through the cooling passage 35 in the casing side region Rcr is higher than the flow rate of air flowing through the cooling passage 35 in the rotor side region Rcr, and the cooling performance in the casing side region Rcc can be made higher than the cooling performance in the rotor side region Rcr, similarly to the fourth embodiment.

Sixth Embodiment of Transition Piece

Figure 18:
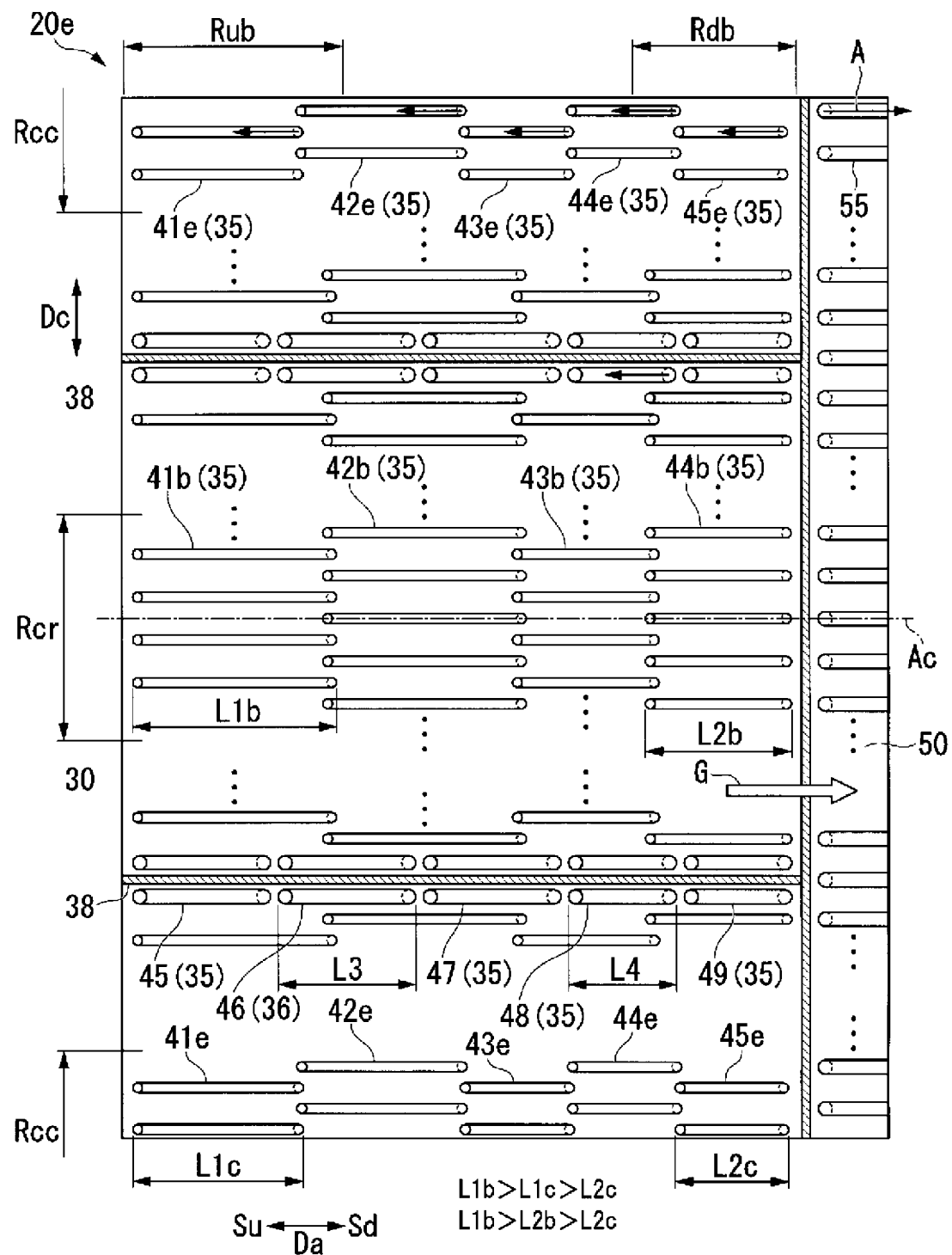
FIG. 18 is a schematic developed view of a transition piece according to a sixth embodiment of the present invention.

A sixth embodiment of the transition piece is described while referring to FIG. 18.

In the transition piece 20c of the fourth embodiment, the passage cross-sectional area of the cooling passage 35 in the casing side region Rcc is larger than the passage cross-sectional area of the cooling passage 35 in the rotor side region Rcr. On the other hand, in a transition piece 20e of the present embodiment, a passage cross-sectional area of the cooling passage 35 in the casing side region Rcc and a passage cross-sectional area of the cooling passage 35 in the rotor side region Rcr are the same, but a passage length of the cooling passage 35 in the casing side region Rcc is shorter than a passage length of the cooling passage 35 in the rotor side region Rcr. The transition piece 20e of the present embodiment is different from the fourth embodiment in this point, but the configuration is otherwise the same as that of the fourth embodiment.

A plurality of first upstream casing side passages 41e, plurality of first upstream rotor side passages 41b, plurality of second upstream casing side passages 42e, plurality of second upstream rotor side passages 42b, plurality of first downstream casing side passages 43e, plurality of first downstream rotor side passages 43b, plurality of second downstream casing side passages 44e, plurality of second downstream rotor side passages 44b, plurality of first through fifth bond side passages 45 through 49, and plurality of outlet flange passages 55 are also formed in the transition piece 20e of the present embodiment, similarly to the transition piece 20c of the fourth embodiment. A plurality of third downstream casing side passages 45e are further formed in the transition piece 20e of the present embodiment. The third downstream casing side passage 45e is provided in the second downstream casing side passage 44e.

A passage length of the first upstream rotor side passage 41b and a passage length of the second upstream rotor side passage 42b are both L1b, similarly to the third embodiment. A passage length of the first downstream rotor side passage 43b and a passage length of the second downstream rotor side passage 44b are both L2b. In the present embodiment, too, the passage length L2b is shorter than the passage length L1b. Furthermore, a passage length of the first upstream casing side passage 41e and a passage length of the second upstream casing side passage 42e are both L1c. Furthermore, a passage length of the first downstream casing side passage 43e, passage length of the second downstream casing side passage 44e, and passage length of the third downstream casing side passage 45e are all L2c. The passage length L2c is shorter than the passage length L1c. Furthermore, the passage length L1c is shorter than the passage length L1b. Furthermore, the passage length L2c is shorter than the passage length L2b. Note that so long as the passage length L1c is shorter than the passage length L1b, the passage length L1c may be longer or shorter than the passage length L2b.

A passage cross-sectional area of the first upstream rotor side passage 41b, passage cross-sectional area of the second upstream rotor side passage 42b, passage cross-sectional area of the first upstream casing side passage 41e, passage cross-sectional area of the second upstream casing side passage 42e, passage cross-sectional area of the first downstream rotor side passage 43b, passage cross-sectional area of the second downstream rotor side passage 44b, passage cross-sectional area of the first downstream casing side passage 43e, passage cross-sectional area of the second downstream casing side passage 44e, and passage cross-sectional area of the third downstream casing side passage 45e are all S1 (refer to FIG. 5, FIG. 11, and the like). Furthermore, the number of the first upstream rotor side passages 41b, number of the second upstream rotor side passages 42b, number of the first upstream casing side passages 41e, number of the second upstream casing side passages 42e, number of the first downstream rotor side passages 43b, number of the second downstream rotor side passages 44b, number of the first downstream casing side passages 43e, number of the second downstream casing side passages 44e, and number of the third downstream casing side passages 45e are mutually the same, similarly to the third embodiment.

Therefore, in the present embodiment, a ratio (S1/L2b) of the passage cross-sectional area S1 to the passage length L2b of the downstream rotor side passages 43b, 44b provided in the downstream side region Rdb within the rotor side region Rcr which is one circumferential region is larger than a ratio (S1/L1b) of the passage cross-sectional area S1 to the passage length L1b of the upstream rotor side passages 41b, 42b provided in the upstream side region Rub within the rotor side region Rcr. Furthermore, a ratio (S1/L2c) of the passage cross-sectional area S1 to the passage length L2c of the downstream casing side passages 43e, 44e, 45e provided in the downstream side region Rdb within the casing side region Rcc which is another circumferential region is larger than a ratio (S1/L1c) of the passage cross-sectional area S1 to the passage length L1c of the upstream casing side passages 41e, 42e provided in the upstream side region Rub within the casing side region Rcc. Furthermore, in the present embodiment, the ratio (S1/L1c) of the passage cross-sectional area S1 to the passage length L1c of the upstream casing side passages 41e, 42e provided in the casing side region Rcc within the upstream side region Rub which is one axial region is larger than the ratio (S1/L1b) of the passage cross-sectional area S1 to the passage length L1b of the upstream rotor side passages 41b, 42b provided in the rotor side region Rcr within the upstream side region Rub. Furthermore, the ratio (S1/L2c) of the passage cross-sectional area S1 to the passage length L2c of the downstream casing side passages 43e, 44e, 45e provided in the casing side region Rcc within the downstream side region Rdb which is one axial region is larger than the ratio (S1/L2b) of the passage cross-sectional area S1 to the passage length L2b of the downstream rotor side passages 43b, 44b provided in the rotor side region Rcr within the downstream side region Rdb.

Therefore, in the present embodiment, the cooling performance of the compressed air A in the downstream side region Rdb can be increased, similarly to the third embodiment. Furthermore, in the present embodiment, the cooling performance of the compressed air A in the casing side region Rcc can be increased, similarly to the fourth and fifth embodiments.

Note that in the present embodiment, a method of making the passage length L1c of the cooling passage 35 in the casing side region Rcc shorter than the passage length L1b of the cooling passage 35 in the rotor side region Rcr is used as a method of increasing the ratio of the passage cross-sectional area to the passage length of the cooling passage 35 provided in the casing side region Rcc within one axial region. However, even if a method of making the passage cross-sectional area of the cooling passage 35 in the casing side region Rcc larger than the passage cross-sectional area of the cooling passage 35 in the rotor side region Rcr is used, the ratio of the passage cross-sectional are to the passage length of the cooling passage 35 provided in the casing side region Rcc within the same axial region can be increased. Therefore, the fourth embodiment can be said to have a ratio of the passage cross-sectional area to the passage length of the cooling passage 35 provided in the casing side region Rcc within one axial region that is larger than a ratio of the cross-sectional area to the passage length of the cooling passage 35 provided in the rotor side region Rcr within the same axial region.

Modified Examples

The first upstream casing side passage 41d, second upstream casing side passage 42d, first downstream casing side passage 43d, and second downstream casing side passage 44d of the fifth embodiment may be used as the first upstream casing side passage 41c, second upstream casing side passage 42c, first downstream casing side passage 43c, and second downstream casing side passage 44c in the fourth embodiment. Furthermore, the first upstream casing side passage 41e, second upstream casing side passage 42e, first downstream casing side passage 43e, second downstream casing side passage 44e, and third downstream casing side passage 45e of the sixth embodiment may be used as the first upstream casing side passage 41c, second upstream casing side passage 42c, first downstream casing side passage 43c, and second downstream casing side passage 44c in the fourth embodiment. Similarly, the first upstream casing side passage 41c, second upstream casing side passage 42c, first downstream casing side passage 43c, and second downstream casing side passage 44c of the fourth embodiment may be used as the first upstream casing side passage 41d, second upstream casing side passage 42d, first downstream casing side passage 43d, and second downstream casing side passage 44d in the fifth embodiment. Furthermore, the first upstream casing side passage 41e, second upstream casing side passage 42e, first downstream casing side passage 43e, second downstream casing side passage 44e, and third downstream casing side passage 45e of the sixth embodiment may be used as the first upstream casing side passage 41d, second upstream casing side passage 42d, first downstream casing side passage 43d, and second downstream casing side passage 44d in the fifth embodiment. Furthermore, the first upstream casing side passage 41c, second upstream casing side passage 42c, first downstream casing side passage 43c, and second downstream casing side passage 44c of the fourth embodiment may be used as the first upstream casing side passage 41e, second upstream casing side passage 42e, first downstream casing side passage 43e, second downstream casing side passage 44e, and third downstream casing side passage 45e in the sixth embodiment. Furthermore, the first upstream casing side passage 41d, second upstream casing side passage 42d, first downstream casing side passage 43d, and second downstream casing side passage 44d of the fifth embodiment may be used as the first upstream casing side passage 41e, second upstream casing side passage 42e, first downstream casing side passage 43e, second downstream casing side passage 44e, and third downstream casing side passage 45e in the sixth embodiment.

In the above-described embodiments, all of the cooling passages 35 of the body portion 30 have the inlet 35i formed at the downstream end portion of the cooling passage 35, and the outlet 35o formed at the upstream end portion of the cooling passage 35. However, some of the cooling passages 35 of the body portion 30 may have an inlet formed at an upstream end portion of the cooling passages 35, and an outlet formed at a downstream end portion of the cooling passages 35, depending on the shape of the body portion 30, accessories provided in the vicinity of the body portion 30, and the like.

In the above-described embodiments, each of the cooling passages 35, 55 has the same cross-sectional area at any position in the axial direction Da. However, the cross-sectional area of any of the cooling passages may be changed in accordance with positional change in the axial direction Da.

In the above-described embodiments, the body portion 30 is formed by the laminate plate 31 having the outer plate 32 and inner plate 34. However, the body portion 30 does not necessarily have to be formed by the laminate plate 31, and may be formed by a single plate.

INDUSTRIAL APPLICABILITY

In one aspect according to the present invention, it is possible to suppress the flow rate of a cooling medium while maintaining the durability of the transition piece.

REFERENCE SIGNS LIST

1 Compressor
4 Combustor
5 Turbine
8 Gas turbine rotor
9 Gas turbine casing
10 Fuel supply unit
20, 20a, 20b, 20c, 20d, 20e Transition piece
21 Combustion gas flow path 30 Body portion
31 Laminate plate
32 Outer plate
34 Inner plate
35, 55 Cooling passage
35i, 55i Inlet
35o, 55o Outlet
36 Thermal barrier coating layer
38 Bonded portion
41, 41a, 41b, 35 First upstream side passage
42, 42a, 42b, 35 Second upstream side passage
43, 43a, 43b, 35 First downstream side passage
44, 44a, 44b, 35 Second downstream side passage
41c, 41d, 41e, 35 First upstream casing side passage
42c, 42d, 42e, 35 Second upstream casing side passage
43c, 43d, 43e, 35 First downstream casing side passage
44c, 44d, 44e, 35 Second downstream casing side passage
45, 35 First bond side passage
46, 35 Second bond side passage
47, 35 Third bond side passage
48, 35 Fourth bond side passage
49, 35 Fifth bond side passage
50 Flange portion
A Compressed air
Ac Combustor axis
Da Axial direction
Dc Circumferential direction
F Fuel
G Combustion gas
Ru1, Ru1a, Ru1b First upstream side region
Ru2, Ru2a, Ru2b Second upstream side region
Rd1, Rd1a, Rd1b First downstream side region
Rd2, Rd2a, Rd2b Second downstream side region

The invention claimed is:

1. A transition piece provided in a gas turbine casing that covers a gas turbine rotor and demarcating a periphery of a combustion gas flow path where combustion gas flows from an upstream side to a downstream side in an axial direction in which an axis extends, wherein:
   a plurality of cooling passages which extend in the axial direction and inside which a cooling medium flows are formed so as to be aligned in a circumferential direction with regard to the axis;
   one or more rotor side passages which are a portion of the plurality of cooling passages are formed in a rotor side region opposing the gas turbine rotor within at least one axial region in the axial direction, and one or more casing side passages which are another portion of the plurality of cooling passages are formed in a casing side region opposing an inner circumferential surface of the gas turbine casing within the axial region; and
   a total cross-sectional area per unit circumferential length of the one or more casing side passages in the casing side region is greater than a total cross-sectional area per unit circumferential length of the one or more rotor side passages in the rotor side region.

2. The transition piece according to claim 1, wherein:
   the plurality of cooling passages are formed so as to be aligned in the circumferential direction and the axial direction with regard to the axis;
   one or more downstream side passages which are a portion of the plurality of cooling passages are formed in a downstream side region on the downstream side within at least one circumferential region in the circumferential direction, and one or more upstream side passages which are another portion of the plurality of cooling passages are formed in an upstream side region on the upstream side with regard to the downstream side region within the circumferential region;
   a total cross-sectional area per unit circumferential length of the one or more downstream side passages in the downstream side region is greater than a total cross-sectional area per unit circumferential length of the one or more upstream side passages in the upstream side region;
   a cross-sectional area of a single downstream side passage of the one or more downstream side passages is larger than a cross-sectional area of a single upstream side passage of the one or more upstream side passages, and
   an upstream side portion of one of the downstream side passages overlaps a downstream side portion of one of the upstream side passages in the axial direction and is shifted therefrom in the circumferential direction such that the upstream side portion of the one of the downstream side passages and the downstream side portion of the one of the upstream side passages are alternately formed in the circumferential direction: and
   the upstream side portion of the one of the downstream side passages includes an outlet of the one of the downstream side passages, and the downstream side portion of the one of the upstream side passages includes an inlet of the one of the upstream side passages.

3. The transition piece according to claim 2, wherein the number of the downstream side passages in the downstream side region is higher than the number of the upstream side passages in the upstream side region.

4. The transition piece according to claim 2, comprising a body portion that demarcates a portion of the combustion gas flow path, is formed by bonding ends of one or more plate materials together, and has a bonded portion that is a portion where the ends of the one or more plate materials are bonded together and extends in the axial direction, wherein the one or more upstream side passages and the one or more downstream side passages are formed in the body portion.

5. The transition piece according to claim 4, wherein a length in the axial direction of a bond side passage of the plurality of cooling passages that is nearest to the bonded portion in the circumferential direction is shorter than a length in the axial direction of an adjacent passage of the plurality of cooling passages that is adjacent to the bond side passage in the circumferential direction.

6. The transition piece according to claim 5, wherein a cross-sectional area of the bond side passage is larger than a cross-sectional area of the adjacent passage.

7. The transition piece according to claim 2, wherein:
   a plurality of downstream side passages of the one or more downstream side passages are formed in the downstream side region, and a plurality of upstream side passages of the one or more upstream side passages are formed in the upstream side region;
   a total cross-sectional area per unit circumferential length of the plurality of the downstream side passages in the downstream side region is greater than a total cross-sectional area per unit circumferential length of the plurality of the upstream side passages in the upstream side region;
   a cross-sectional area of a single downstream side passage of the plurality of the downstream side passages is larger than a cross-sectional area of a single upstream side passage of the plurality of the upstream side passages;
   the plurality of the downstream side passages include a first downstream side passage and a second downstream side passage which is located on downstream of the first downstream side passage;

the plurality of the upstream side passages include a first upstream side passage and a second upstream side passage which is located on downstream of the first upstream side passage;

a downstream side end of the second downstream side passage is located on downstream of a downstream side end of the first downstream side passage;

an upstream side end of the first upstream side passage is located on upstream of an upstream side end of the second upstream side passage;

an upstream side portion of the second upstream side passage overlaps a downstream side portion of the first upstream side passage in the axial direction and is shifted therefrom in the circumferential direction such that the upstream side portion of the second upstream side passage and the downstream side portion of the first upstream side passage are alternately formed in the circumferential direction;

an upstream side portion of the first downstream side passage overlaps a downstream side portion of the second upstream side passage in the axial direction and is shifted therefrom in the circumferential direction such that the upstream side portion of the first downstream side passage and the downstream side portion of the second upstream side passage are alternately formed in the circumferential direction;

an upstream side portion of the second downstream side passage overlaps a downstream side portion of the first downstream side passage in the axial direction and is shifted therefrom in the circumferential direction such that the upstream side portion of the second downstream side passage and the downstream side portion of the first downstream side passage are alternately formed in the circumferential direction;

the upstream side portion of the second upstream side passage includes an outlet of the second upstream side passage, and the downstream side portion of the first upstream side passage includes an inlet of the first upstream side passage;

the upstream side portion of the first downstream side passage includes an outlet of the first downstream side passage, and the downstream side portion of the second upstream side passage includes an inlet of the second upstream side passage; and the upstream side portion of the second downstream side passage includes an outlet of the second downstream side passage, and the downstream side portion of the first downstream side passage includes an inlet of the first downstream side passage.

8. The transition piece according to claim 1, wherein the number of the casing side passages in the casing side region is higher than the number of the rotor side passages in the rotor side region.

9. The transition piece according to claim 1, wherein the cross-sectional area of a single casing side passage of the one or more casing side passages is larger than the cross-sectional area of a single rotor side passage of the one or more rotor side passages.

10. The transition piece according to claim 1, comprising a body portion that demarcates a portion of the combustion gas flow path, is formed by bonding ends of one or more plate materials together, and has a bonded portion that is a portion where the ends of the one or more plate materials are bonded together and extends in the axial direction, wherein the one or more casing side passages and the one or more rotor side passages are formed in the body portion.

11. The transition piece according to claim 1, wherein, in at least some cooling passages of the plurality of cooling passages, an inlet into which the cooling medium flows is formed at a downstream side end portion, and an outlet out of which the cooling medium flows is formed at an upstream side end portion.

12. The transition piece according to claim 1, wherein the plurality of cooling passages each have the same cross-sectional area at any position in the axial direction.

13. The transition piece according to claim 1, wherein
the one or more rotor side passages comprises a plurality of rotor side passages formed in the rotor side region, and the one or more casing side passages comprises a plurality of casing side passages formed in the casing side region, and
the plurality of the rotor side passages are isolated from each other, and the plurality of the casing side passages are isolated from each other.

14. A combustor, comprising:
the transition piece according to claim 1; and
a fuel supply unit supplying fuel and air into the combustion gas flow path.

15. A gas turbine, comprising:
the combustor according to claim 14;
a compressor that compresses air and supplies the compressed air to the combustor; and
a turbine that is driven by the combustion gas from the combustor.

* * * * *